United States Patent
Harel et al.

(10) Patent No.: US 11,995,177 B2
(45) Date of Patent: May 28, 2024

(54) IN-MEMORY PROTECTION FOR CONTROLLER SECURITY

(71) Applicant: Karamba Security Ltd., Hod Sharon (IL)

(72) Inventors: Assaf Harel, Ramat Hasharon (IL); Amiram Dotan, Birmingham, MI (US); Tal Efraim Ben David, Hogla (IL); David Barzilai, Hod Hasharon (IL)

(73) Assignee: Karamba Security Ltd., Tel Aviv (IL)

( * ) Notice: Subject to any disclaimer, the term of this patent is extended or adjusted under 35 U.S.C. 154(b) by 549 days.

(21) Appl. No.: 17/330,478

(22) Filed: May 26, 2021

(65) Prior Publication Data

US 2021/0349991 A1    Nov. 11, 2021

Related U.S. Application Data

(63) Continuation of application No. 16/234,714, filed on Dec. 28, 2018, now Pat. No. 11,023,574, which is a
(Continued)

(51) Int. Cl.
*G06F 21/52* (2013.01)
*G06F 11/36* (2006.01)
(Continued)

(52) U.S. Cl.
CPC .......... *G06F 21/52* (2013.01); *G06F 11/3668* (2013.01); *G06F 21/51* (2013.01);
(Continued)

(58) Field of Classification Search
CPC ...... G06F 21/52; G06F 21/562; G06F 21/566; G06F 21/577; G06F 11/3668; H04L 67/12
See application file for complete search history.

(56) References Cited

U.S. PATENT DOCUMENTS 8,090,816 B1    1/2012  Deshmukh et al.
8,555,385 B1   10/2013  Bhatkar et al.
(Continued)

FOREIGN PATENT DOCUMENTS

EP           2892199 A1    7/2015
WO    WO 2013/063474 A1   5/2013
WO    WO 2016/046819 A1   3/2016

OTHER PUBLICATIONS

Fardin, Abad et al., "On-chip control flow integrity check for real time embedded systems", 2013 IEEE 1st International Conference on Cyber-Physical Systems, Networks, and Applications (CPSNA), IEEE, Aug. 19, 2013, pp. 26-31.
(Continued)

*Primary Examiner* — Thaddeus J Plecha
(74) *Attorney, Agent, or Firm* — Finnegan, Henderson, Farabow, Garrett & Dunner LLP

(57) ABSTRACT

In one implementation, a method for providing security on controllers includes detecting computer-readable code running on a controller, the computer-readable code including code portions that each include instructions to be performed by the controller; identifying a current code portion of the computer-readable code; accessing an in-memory graph that models an operational flow of the computer-readable code, wherein the in-memory graph includes a plurality of nodes, each of the nodes corresponding to one of the code portions and each of the nodes having a risk value for the associated code portion that is a measure of security risk for the associated code portion; identifying the risk value for the current code portion; selecting, from a plurality of available flow control integrity (IMV) schemes, an IMV scheme based on the identified risk value; and applying, to the code portion as the code portion is running on the controller, the selected IMV scheme.

20 Claims, 9 Drawing Sheets

Related U.S. Application Data continuation of application No. 15/997,167, filed on Jun. 4, 2018, now Pat. No. 10,204,219, which is a continuation-in-part of application No. 15/614,187, filed on Jun. 5, 2017, now Pat. No. 10,878,103.

(51) Int. Cl.
| | | |
|---|---|---|
| *G06F 21/51* | (2013.01) | |
| *G06F 21/56* | (2013.01) | |
| *G06F 21/57* | (2013.01) | |
| *H04L 67/12* | (2022.01) | |

(52) U.S. Cl.
CPC .......... *G06F 21/562* (2013.01); *G06F 21/566* (2013.01); *G06F 21/577* (2013.01); *G06F 2221/033* (2013.01); *H04L 67/12* (2013.01)

(56) References Cited

U.S. PATENT DOCUMENTS

| | | |
|---|---|---|
| 9,230,112 B1 | 1/2016 | Peterson et al. |
| 9,530,016 B1 | 12/2016 | Pomerantz |
| 9,754,112 B1 | 9/2017 | Moritz et al. |
| 2005/0044538 A1 | 2/2005 | Mantripragada |
| 2005/0188214 A1* | 8/2005 | Worley .................. G06F 21/52 713/187 |
| 2008/0072214 A1 | 3/2008 | Peyton et al. |
| 2009/0144698 A1 | 6/2009 | Fanning et al. |
| 2010/0251328 A1 | 9/2010 | Syed et al. |
| 2011/0083186 A1 | 4/2011 | Niemela et al. |
| 2013/0086625 A1 | 4/2013 | Driscoll et al. |
| 2013/0097660 A1 | 4/2013 | Das et al. |
| 2013/0097708 A1 | 4/2013 | Jayanthi et al. |
| 2014/0090067 A1 | 3/2014 | Tripp |
| 2014/0136710 A1 | 5/2014 | Benari et al. |
| 2015/0150124 A1 | 5/2015 | Zhang et al. |
| 2015/0309913 A1 | 10/2015 | Bates et al. |
| 2015/0370560 A1 | 12/2015 | Tan et al. |
| 2016/0142410 A1 | 5/2016 | Mazzara, Jr. |
| 2016/0182558 A1 | 6/2016 | Tripp |
| 2016/0253497 A1* | 9/2016 | Christodorescu ..... G06F 21/566 726/23 |
| 2017/0017789 A1 | 1/2017 | Daymont |
| 2017/0063896 A1 | 3/2017 | Muddu et al. |
| 2017/0093866 A1 | 3/2017 | Ben-Noon |
| 2017/0185803 A1 | 6/2017 | Shanbhogue et al. |
| 2018/0114026 A1 | 4/2018 | Wang et al. |
| 2018/0255082 A1 | 9/2018 | Ostergaard |
| 2018/0260562 A1* | 9/2018 | Chen .................. G06F 16/9024 |

OTHER PUBLICATIONS

Martin, Abadi et al., "Control-flow integrity", Proceedings of the 12th ACM Conference on Computer and Communications Security, Nov. 7, 2005, pp. 340-353.

Chen, Liu et al., "Leveraging microarchitectural side channel information to efficiently enhance program control flow integrity", 2014 International Conference on Hardware/Software Codesign and System Synthesis, Oct. 12, 2014, pp. 1-9.

Lucas, Davi et al., "Hardware-assisted fine-grained control-flow integrity: Towards efficient protection of embedded systems against software exploitation", 2014 51st ACM/EDAC/IEEE Design Automation Conference (DAC), IEEE, Jun. 1, 2014, pp. 1-6.

International Search Report and Written Opinion in International Application No. PCT/IB2018/053994, dated Dec. 3, 2018, 21 pages.

International Search Report and Written Opinion in International Application No. PCT/IB2017/051964, dated Jun. 26, 2017, 19 pages.

International Search Report and Written Opinion in International Application No. PCT/IB2017/051965, dated Aug. 18, 2017, 20 pages.

International Search Report and Written Opinion in International Application No. PCT/IB2017/051967, dated Jun. 12, 2017, 17 pages.

"Method for protecting code from running in unlicensed environments," ip.com Journal, Jun. 17, 2014, 1-2.

International Search Report and Written Opinion in International Application No. PCT/IB2017/05195S, dated Jun. 19, 2018, 22 pages.

Abadi et al., XFI: Software Guards for System Address Spaces, 2006, USENIX Association, OSDI '06 pp. 75-88 (Year: 2006).

Davi et al., ROPdefender: A Detection Tool to Defend Against Return-Oriented Programming Attacks, ACM, ASIACCS '11, Mar. 22-24, 2011, Hong Kong, China, pp. 40-51 (Year: 2011).

\* cited by examiner

IN-MEMORY PROTECTION FOR CONTROLLER SECURITY

CROSS-REFERENCE TO RELATED APPLICATIONS

This application is a continuation of U.S. patent application Ser. No. 16/234,714, filed on Dec. 28, 2018, currently pending, which is a continuation of U.S. patent application Ser. No. 15/997,167, filed on Jun. 4, 2018, which issued as U.S. Pat. No. 10,204,219 on Feb. 12, 2019, which is a continuation-in-part of U.S. patent application Ser. No. 15/614,187, filed on Jun. 5, 2017, which issued as U.S. Pat. No. 10,878,103 on Dec. 29, 2020. The disclosures of the above-referenced applications are expressly incorporated herein by reference in their entireties.

TECHNICAL FIELD

This specification generally relates to security for computer-based controllers, such as controllers for Internet of Things (IoT) devices.

BACKGROUND

More devices are becoming "smarter" with hardware and software that permit them to communicate via the internet, such as through cellular wireless networks, Wi-Fi, and Bluetooth. These internet-connected devices are often identified as being part of the "Internet of Things" (IoT), which is a term that broadly encompasses internet-connected devices configured to transmit and receive information related to their operation, such as status information. For example, many consumer products are now IoT devices with internet-connected features, such as home automation devices (e.g., wirelessly controllable light switches), appliances (e.g., smart refrigerators able to transmit images of the fridge's contents), and automobiles (e.g., internet-connected components, such as infotainment and navigation devices). For instance, modern vehicles can have over 100 controllers, or Electronic Control Units (ECUs), that are responsible for running most of the car's functions, such as the steering wheel, engine, braking system, airbags, and navigation systems.

Like any other externally connected computers, IoT devices (e.g., ECUs in connected cars) are vulnerable to cyber attack and have become targets for hackers. For example, controllers on several makes and models of cars, such as the JEEP CHEROKEE, TOYOTA PRIUS, TESLA MODEL S, and NISSAN LEAF, have been successfully targeted and exploited by white hat hackers. Those hackers were able to compromise the vehicles and take command of nearly all of the control aspects, ranging from turning on the radio and windshield wipers to killing the engine while the car drove on the freeway. These exploits caused some of these car manufacturers to issue a recall on affected vehicles.

Cyber attacks come in many forms and flavors, but they generally share the same basic concepts: find a preexisting security bug (vulnerability) in the system's software, exploit it, and run malware. A common security bug is neglecting to verify the size of input buffers, which hackers can exploit by passing long buffers that get out of the boundaries allocated for that buffer on the software stack. By getting out of the buffer boundaries, hackers may be able to access and change the pointer structure that controls the functional flow of code, which hackers can use to direct the controller to execute malware code. Although malware code can vary (e.g., keylogger, ransomware, e-mail spam), the exploitation mechanism is often similar—find a security bug, research and learn how to exploit it in order to gain control, and use the control to run the malware code.

SUMMARY

This document generally describes a technological solution that hardens externally connected controllers (e.g., ECUs) within an IoT device (e.g., connected automobile) against hackers. Customized security policies for controllers can be generated and added to controllers with security layers, which can use the security policies and layers to ensure that only valid code and valid behaviors are allowed to run on the controllers. Various features can be used to ensure controllers are limited to operating with valid code and valid behaviors, such as using whitelists that define permitted code, permitted contexts within which the code can run, and permitted relationships between code segments, such as code that is permitted to call and/or return to other code segments.

For example, ECUs on a car can each include a custom security policy that defines conditional in-memory validation (IMV) schemes to be applied when executing software instructions. Generally, in the process of IMV, software instructions are changed to include special control commands that guarantee that each function call jump and returns only to a predefined list of known addresses. Jumping to a different address can be interpreted as an attack and the protection mechanism blocks this from happening. Conditional IMV can permit for differing levels of IMV to be applied to appropriate code segments based on any of a variety of factors, such as risk levels determined for code segments.

In one implementation, a method for providing security on controllers includes identifying a risk level of a code portion of computer-readable code running on a controller; and applying conditional in-memory validation to the computer-readable code based on the identified risk level.

In another implementation, a method for providing security on controllers includes detecting computer-readable code running on a controller, the computer-readable code being stored in a memory in a plurality of code portions, each code portion including one or more instructions to be performed by the controller; responsive to detecting the computer-readable code running on the controller, identifying a current code portion of the computer-readable code that is running; accessing an in-memory graph that models an operational flow of the computer-readable code, wherein the in-memory graph includes a plurality of nodes, each of the nodes corresponding to one of the code portions and each of the nodes having a risk value for the associated code portion that is a measure of security risk for the associated code portion; identifying the risk value for the current code portion; selecting, from a plurality of available flow control integrity (IMV) schemes, an IMV scheme based on the identified risk value; applying, to the code portion as the code portion is running on the controller, the selected IMV scheme; and responsive to a determination that the computer-readable code running on the controller fails the selected IMV scheme, taking a corrective action.

Such a method can optionally include one or more of the following features, which can be combined in each possible sub-combination of features. The method can further include analyzing the computer-readable code to determine the operational flow of the computer-readable code; generating the in-memory graph from the analysis of the computer-readable code; and providing the in-memory graph to the controller for later access. The method can further include analyzing the computer-readable code to determine the operational flow of the computer-readable code. Generating the in-memory graph from the analysis of the computer-readable code can further include generating the risk values from the analysis of the computer-readable code to determine the operational flow of the computer-readable code. The plurality of available IMV schemes can consist of three schemes and the risk values consist of three risk values. The selected IMV scheme can specify that no IMV checking should be done and wherein applying the IMV scheme includes performing no IMV checking to the instructions of the current code portion. The selected IMV scheme can specify that function validation should be done. Applying the IMV scheme can include verifying that memory locations referenced by instructions of the current code portion contain the computer-readable code. Verifying that memory locations referenced by instructions of the current code portion contain the computer-readable code can include determining that a memory location referenced by an instruction of a current code portion is configured to cause control of the computer-readable code to move to a memory address that does not contain a portion of the computer-readable code. The selected IMV scheme can specify that memory addresses should be verified and wherein applying the IMV scheme includes verifying memory address referenced by instructions of the current code portion. Verifying memory address of instructions of the current code portion can include accessing a predefined list of approved destinations for the instructions of the current code portion; and determining that a memory address referenced by an instruction of a current code portion is configured to cause control of the computer-readable code to move to a memory address that is not included in the predefined list. Applying, to the code portion as it is running on the controller, the selected IMV scheme can include analyzing return calls in the instructions of the current code portion. The method further can further include setting watchpoints in the memory on unallocated addresses; detecting control of the running computer-readable code at one of the watchpoints; and responsive to detecting control of the running computer-readable code at one of the watchpoints, applying a corrective action.

In another implementation, a method for providing security on controllers includes initiating static analysis on computer-readable code that is programmed to be run by a controller to control operation on the controller; building, by a computer system, an in-memory graph that includes nodes representing distinct code portions within the computer-readable code and edges representing calls between the distinct code portions; identifying, by the computer system, first code portions from among the distinct code portions based on the first code portions each performing at least one memory modification operation; identifying, by the computer system using the in-memory graph, second code portions from among the distinct code portions based on each of the second code portions calling, either directly or indirectly, one or more of the first code portions; identifying, by the computer system using the in-memory graph, third code portions from the distinct code portions that are not included in either the first or second code portions; determining, by the computer system, risk levels for each of the distinct code portions based on their corresponding designation as either first, second, or third code portions; and recording the risk-level determinations for each of the code portions in a security policy for the controller, the security policy being used to implement conditional IMV by the controller for each of the code portions.

Such a method can optionally include one or more of the following features, which can be combined in each possible sub-combination of features. The distinct code portions can include functions in the computer-readable code. The method can further include tagging, by the computer system, first nodes in the in-memory graph that correspond to the first code portions as being the first code portions. Identifying the second code portions can include performing a reverse walk through the in-memory graph emanating from each of the first nodes and moving backward along directional edges indicating a code portion calling another code portion, wherein each node traversed in the reverse walk is identified as a second node that corresponds to one of the second code portions. The method can further include tagging, by the computer system, the second nodes as being the second code portions. Identifying the third code portions can include identifying third nodes in the in-memory graph that are not yet tagged as either first nodes or second nodes, the third nodes corresponding to the third code portions. The first code portions can be determined to have a high-risk level, the second code portions can be determined to have a medium-risk level, and the third code portions can be determined to have a low risk-level. The security policy, when implemented at runtime by the controller, can cause the controller to perform a full-IMV scheme for the first code portions, the controller to perform a partial-IMV scheme for the second code portions, and the controller to perform a no-IMV scheme for the third code portions. Performing the full-IMV scheme can include verifying memory locations for calls to other code portions and one or more addresses to which the current code portion returns processing flow. Performing the partial-IMV scheme can include verifying that calls to other code portions are function calls. Performing the no-IMV scheme can include not performing any IMV checks for the current code portion. The first code portions can be identified based on each of the first code portions each performing at least one memory modification operation that uses one or more values dynamically-determined at runtime.

In another implementation, a method for providing security on controllers includes detecting computer-readable code running on a controller, the computer-readable code being stored in a memory in a plurality of code portions, each code portion including one or more instructions to be performed by the controller; responsive to detecting the computer-readable code running on the controller, identifying a current code portion of the computer-readable code that is running; determining whether to dynamically set one or more watchpoints on the controller with regard to the current code portion, the determination being made before performing the current code portion; in response to determining to dynamically allocate the one or more watchpoints, identifying one or more locations in memory related to the current code portion at which to set the one or more watchpoints; setting, by the controller, the one or more watchpoints at the one more locations in memory; and running, by the controller, the current code portion with the one or more watchpoints dynamically set at the one or more locations.

Such a method can optionally include one or more of the following features, which can be combined in each possible sub-combination of features. The method can further include detecting, by the controller, that one or more of the watchpoints have been triggered; and applying, by the controller, corrective action with regard to the triggered watchpoint.

The corrective action can include transmitting an alert to a remote computer system that the watchpoint has been triggered. The determination of whether to dynamically set the one or more watchpoints can be made based on a risk level associated with the current code portion. The risk level associated with the current code portion can be determined based on, at least, whether the current code portion allocates memory or calls other code portions that allocate memory. The determination of whether to dynamically set the one or more watchpoints can be made based on a current condition on the controller. The risk level associated with the current code portion can be determined based on, at least, whether the current code portion modifies memory using one or more values dynamically-determined at runtime or calls other code portions that modify memory using one or more values dynamically-determined at runtime.

Certain implementations can provide one or more of the following advantages. For example, the operations of IoT devices may be made more secure by applying special techniques to the execution of software on a controller of the IoT device. By using varying levels of security through conditional IMV, for example, controllers can scale resources that are dedicated to security to correlate to the current known security threat to the controller. This can permit controllers to conserve resources (e.g., memory, processor cycles, network bandwidth) that are used to ensure secure controller operation and to allocate additional resources when increased risks are present. Conditional IMV can be used to allocate resources (e.g., apply resources differing levels of IMV-type checks) to areas of code in which there are greater risks of insecure operations. For example, by identifying portions of an in-memory graph that are likely to present a low security risk, such as portions that do not modify (e.g., write to) and/or allocate any memory in stack and which call no functions that modify and/or allocate memory in stack, those portions of the in-memory graph may be pruned from IMV operation, eliminating the need to use IMV-related overhead to safe portions of code. In another example, by identifying portions of an in-memory graph that are likely to present a moderate security risk, a partial IMV operation (as opposed to a full IMV operation) can be performed that uses fewer resources than a full IMV operation, such as validating only that the caller is a function, and not the address for the function. Such partial IMV operations can, for example, strike a balance between risk and resource usage—permitting some types of functions that pose a smaller security risk to have some protection from in-memory attacks without the processing and resource overhead needed to perform full IMV validation (e.g., validating addresses of functions).

In another example, security risks can be dynamically determined based on changing conditions on a controller and can be used to dynamically adjust the level of security provided under a conditional IMV scheme. For example, in the event that the controller is operating in a safe mode of operation, which may occur when the controller or other controllers have blocked a malware or hacking attempt, risk levels associated with one or more types of functions can be dynamically increased, which can cause additional resources may be allocated to implement full IMV features to ensure secure operation of the controller in the face of a current security threat. For instance, by controllers notifying each other of an attack attempt (e.g., ECUs notifying each other of an attack on a vehicle), not only can the security of the controller under attack be increased during the attack, but the overall security of all controllers can be increased during the attack.

Additional and/or alternative advantages are also possible, as described below.

BRIEF DESCRIPTION OF THE ATTACHMENTS

Figure 4A:
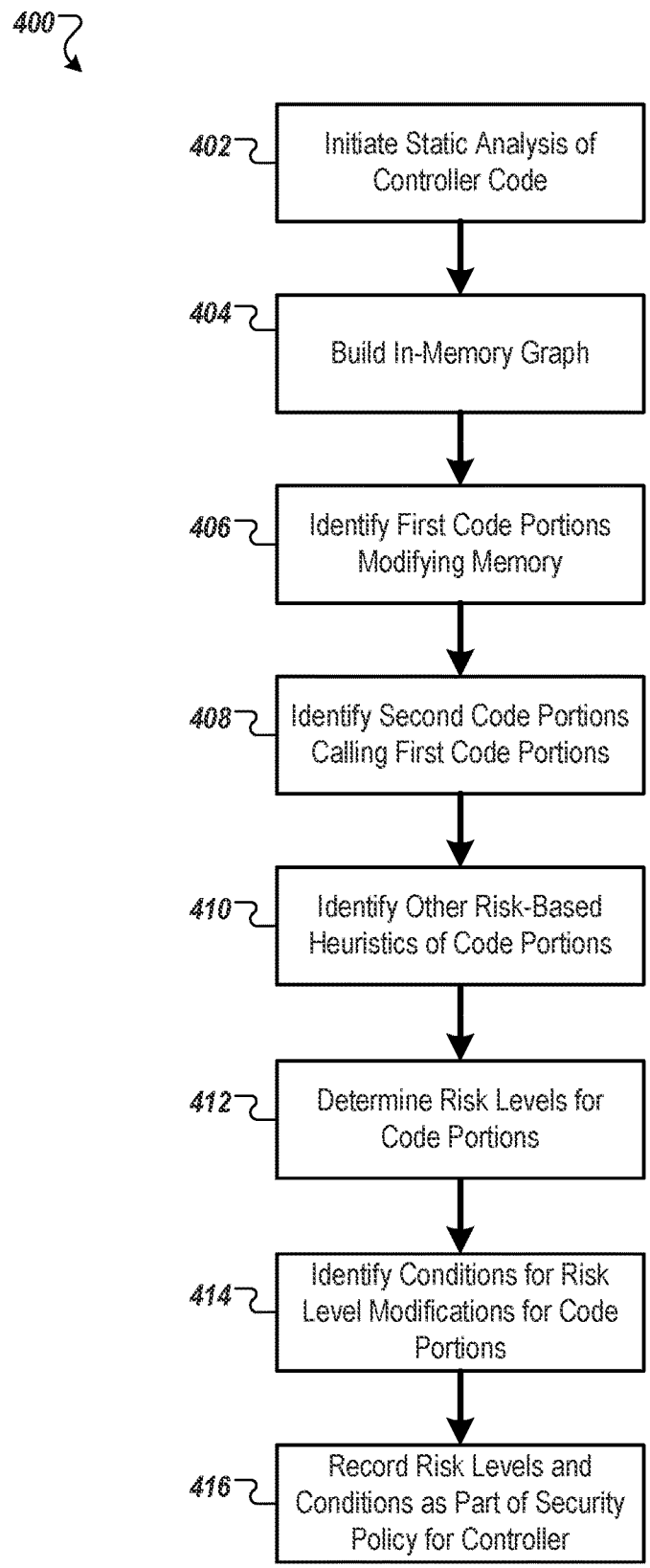
Figure 4B:
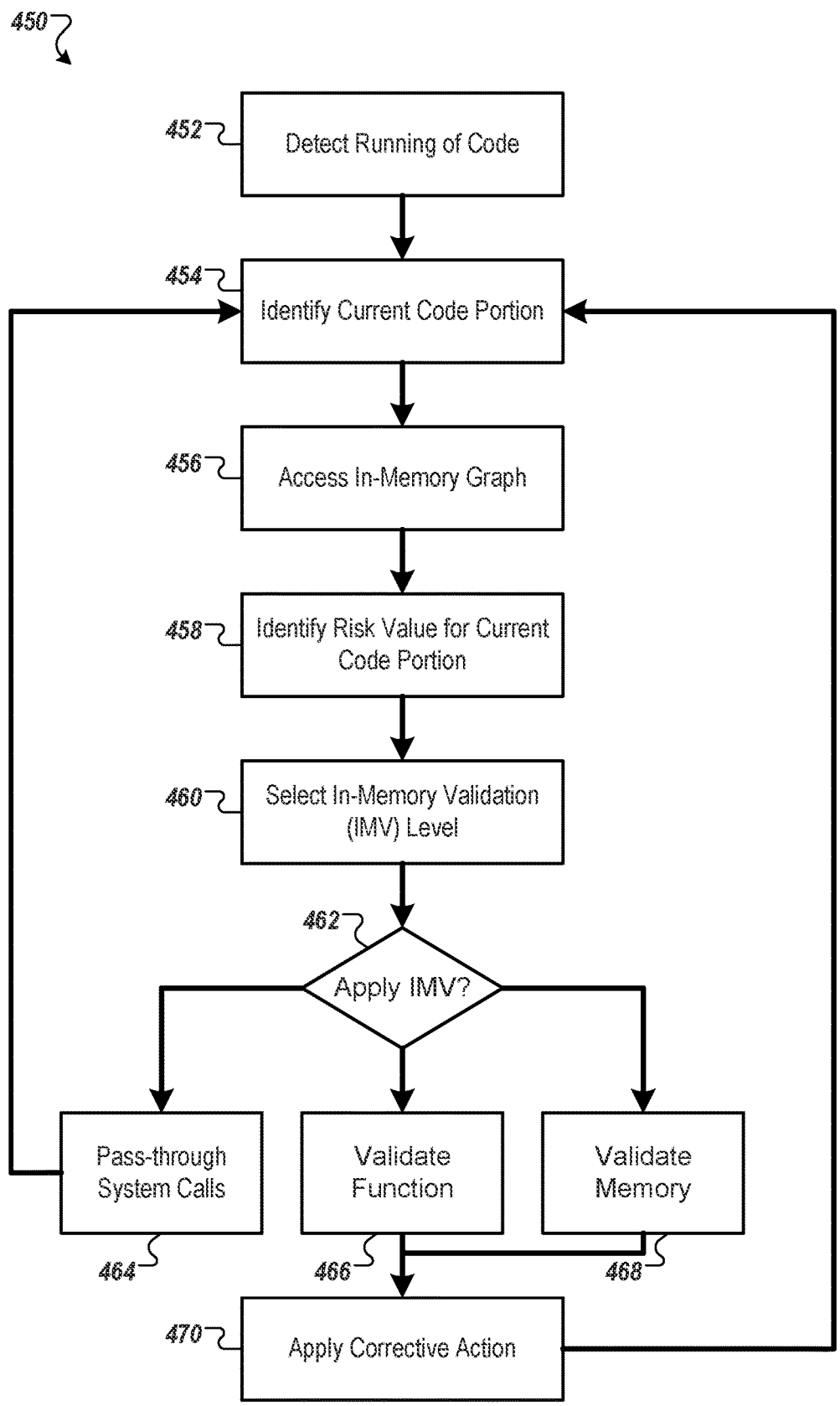

FIGS. 4A-B are flowcharts of example processes for implementing conditional in-memory validation on a software controller.

Figure 5:
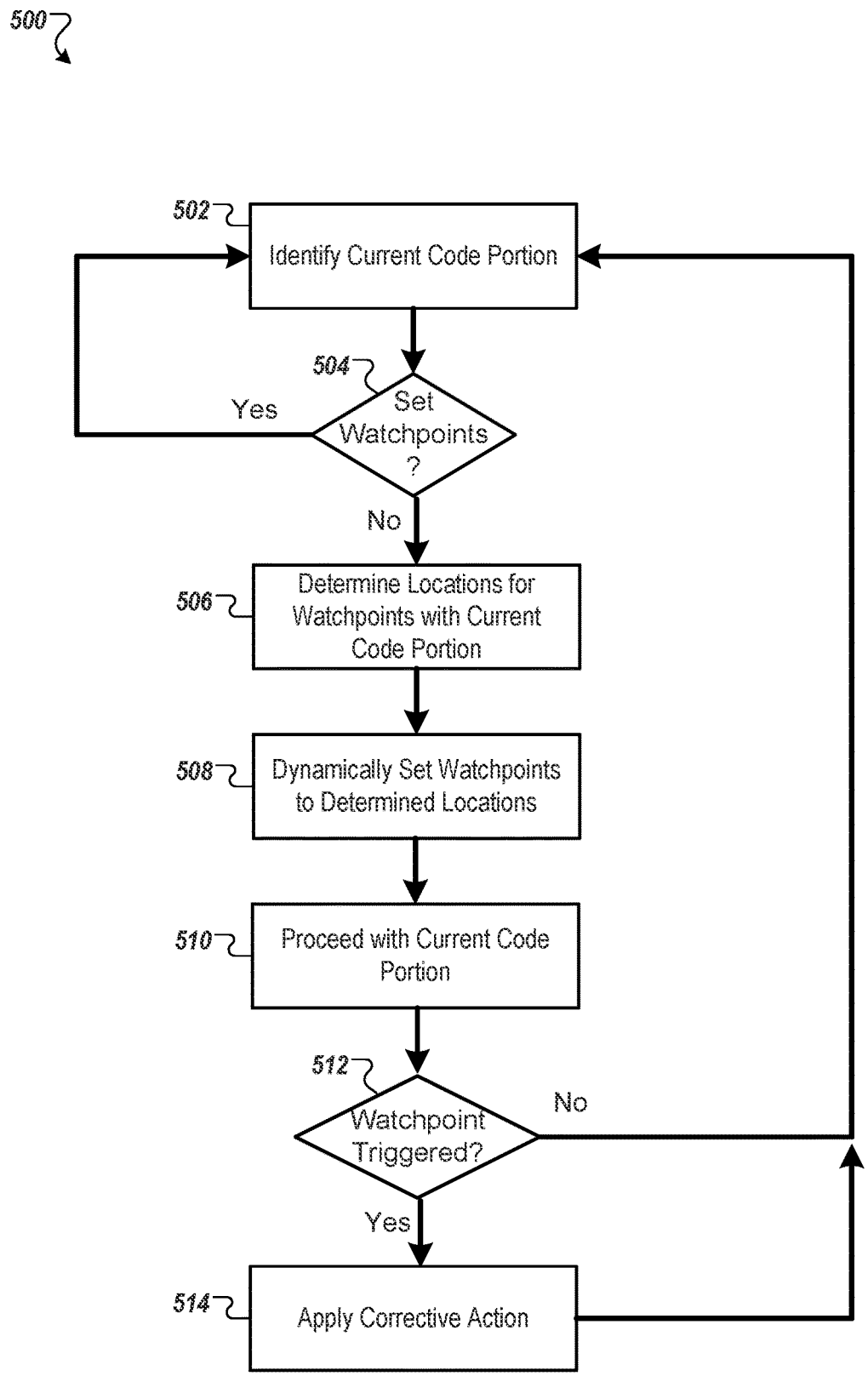

FIG. 5 is a flowchart of an example process for dynamically setting watchpoints during controller operation.

Figure 6:
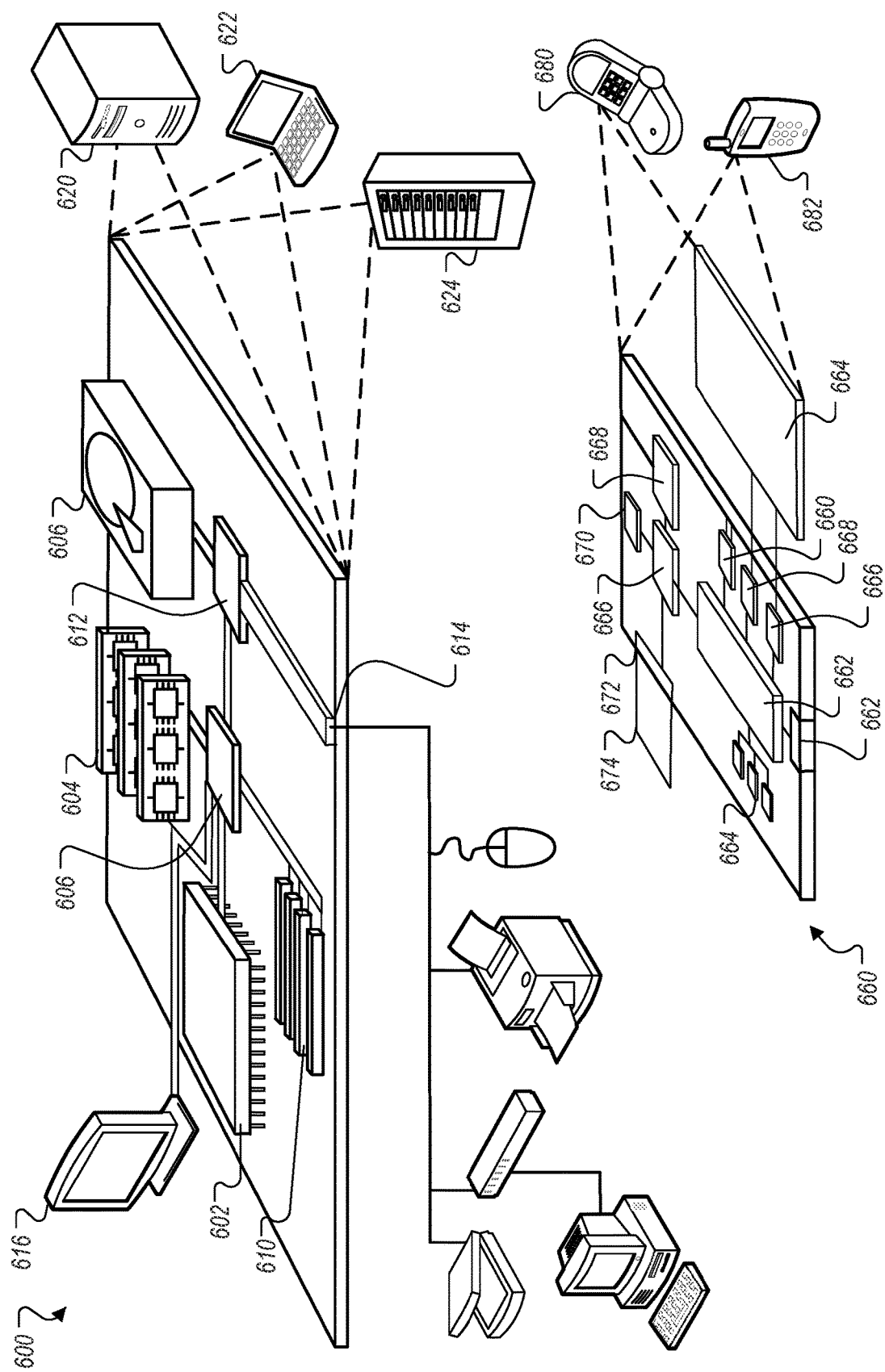

FIG. 6 is a block diagram of example computing devices.

Figure 7:
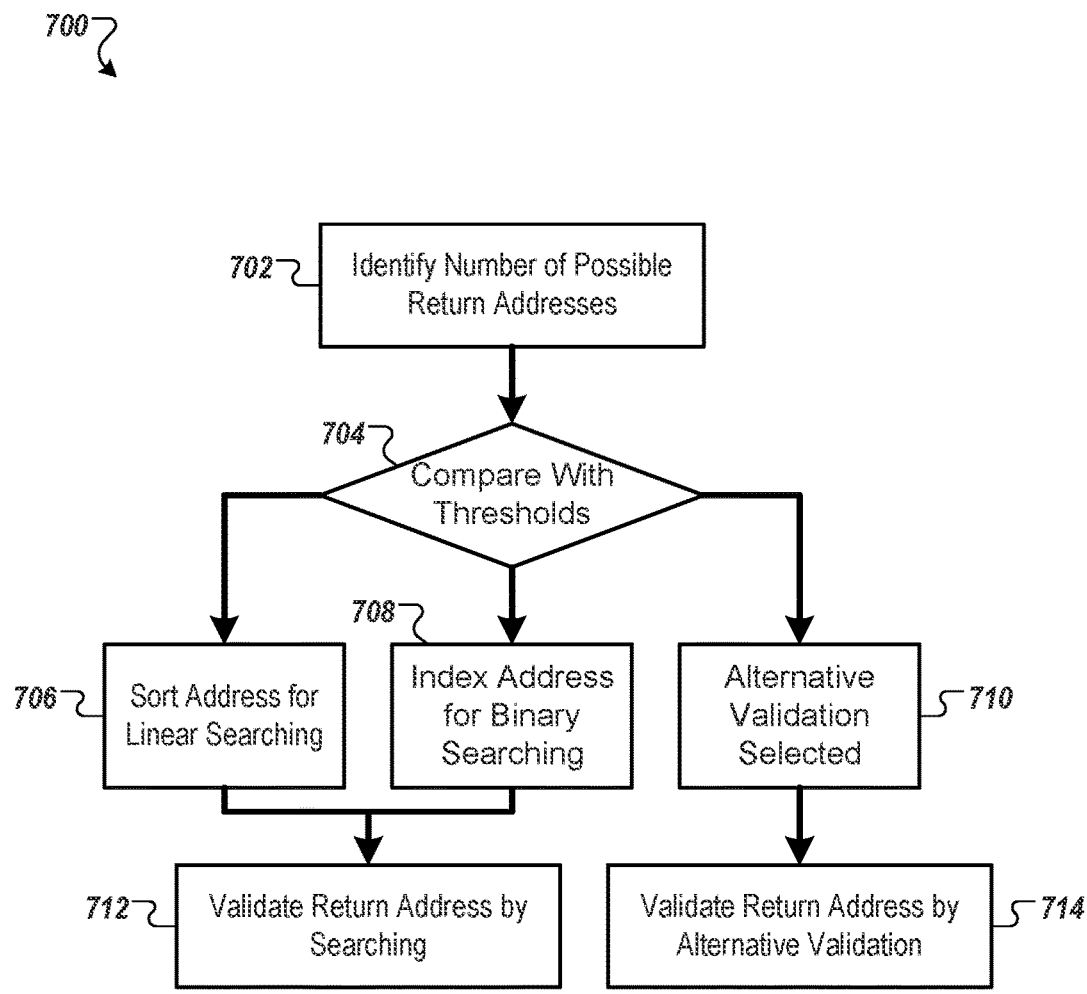

FIG. 7 is a flowchart of an example process for selecting a form of validation.

Like reference numbers and designations in the various drawings indicate like elements.

DETAILED DESCRIPTION

This document generally describes conditional in-memory validation (IMV) schemes to provide enhanced security for controllers. In general, IMV schemes can provide some guarantees that function calls and returns are addressed only to safe or expected memory addresses. Conditional IMV schemes include multiple different and varying levels of IMV security that can be applied for different code and operating conditions, such as risk levels posed by code segments (e.g., functions) and/or current controller context (e.g., current mode of operation). For example, a conditional IMV scheme can include multiple different levels of IMV security that are selected and applied to particular code segments based on levels of security risk posed by the code segments. The different levels of IMV security can use different levels of controller resources (e.g., processor cycles, memory, disc reads/writes), with higher levels of IMV security using more controller resources than lower levels of IMV security. By selecting appropriate levels of IMV security from a conditional IMV security scheme to correspond to the likely security risk posed by code segments, an appropriate balance can be struck between IMV-related overhead (e.g., controller resource usage) and security risks posed by code segments to controller security. For example, the IMV security level applied to code segments can be reduced in safe conditions (e.g., low risk posed by the code segments) while additional resources can be used to implement higher levels of IMV security for riskier conditions.

Security risks posed by portions of code (e.g. individual functions, branches in an in-memory graph) can be determined based on a variety of factors, such as based on analysis of the specific code portions and/or the context of the controller, more generally. For example, specific code portions can be analyzed to determine the risk of exposure to in-memory attacks. Indicators of risk can include, for example, the modification of memory, the type of memory that is being modified (e.g., modification using statically-defined value at compile time, modification using value dynamically during runtime through runtime calculation or input data), the allocation of memory, calling of other functions, and/or other risk indicators. For instance, functions that do not modify memory, allocate memory, and/or call other functions can be considered present a low security risk, while functions that modify memory, allocate memory, call other functions, and/or jump to other memory addresses can be classified with one or more levels of heightened riskiness. No validation or lesser levels of validation can be applied to relatively safe (low security risk) portions of code, while greater levels of validation can be applied to relatively riskier portions of code.

Additionally and/or alternatively, the risk of the operating environment on controllers can be monitored and used to dynamically adjust the level of IMV security applied by some or all code segments on the controller, with greater validation generally being applied when the environment is comparatively more risky. For example, controller context (e.g., current mode of operation, current security status) can be monitored and used to determine the level of risk on the controller, which can be used to dynamically adjust the level of IMV security for some or all functions on the controller. For instance, IoT devices may generate reports for attempted or successful intrusions including in-memory attacks. These reports can be aggregated and used to determine if a broad series of attacks are being leveled against the IoT devices. If, from those aggregated reports, it is determined that attacks are being leveled, the controllers of the IoT devices can be notified and operate in a secure mode (applied when the device is under attack) with greater IMV security level protection than the default IMV security level that would otherwise be applied when operating under a normal mode of operation (when the device is not under attack).

Figure 1A:
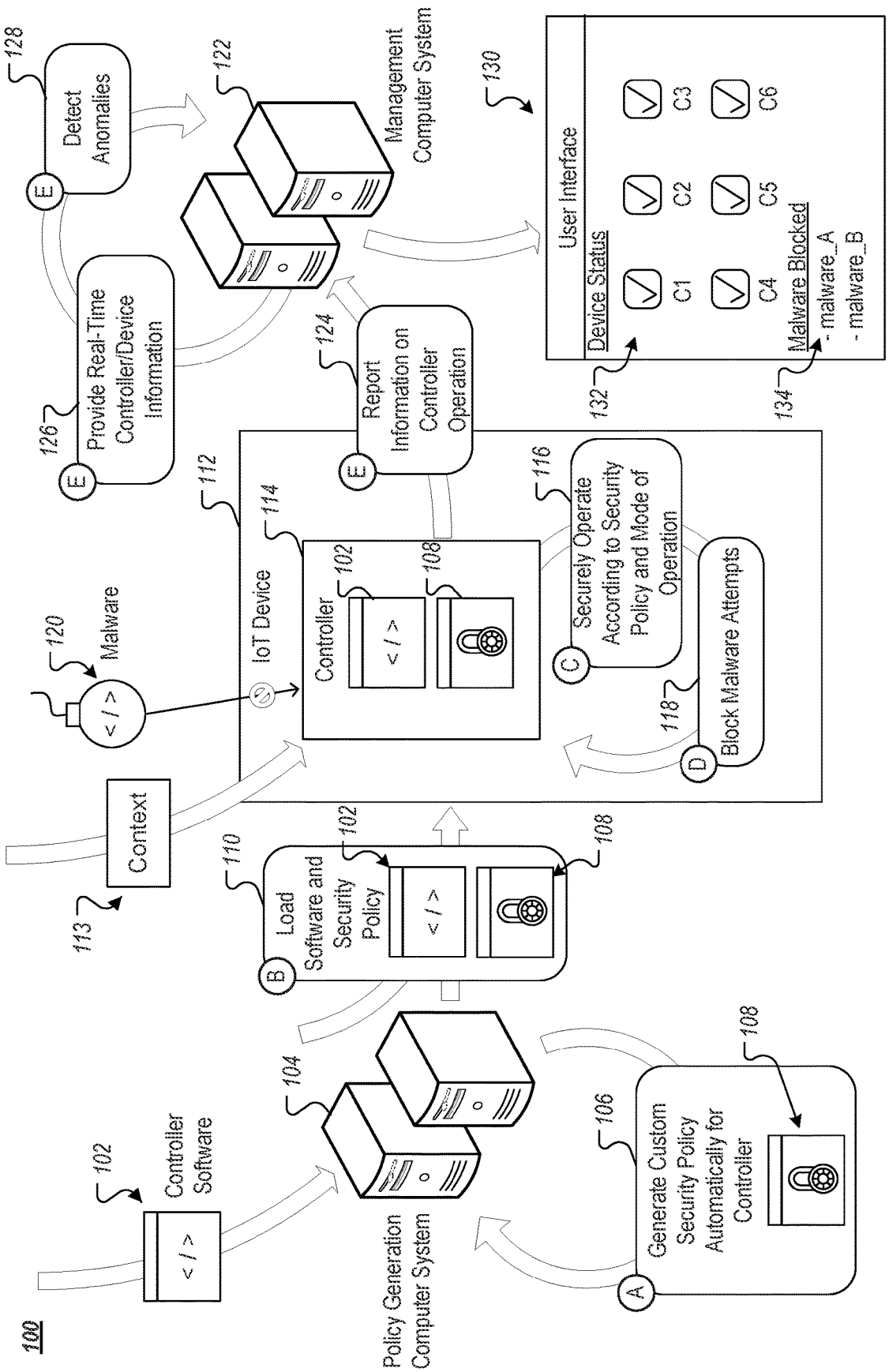
FIG. 1A is a conceptual diagram of an example system for generating and implementing a custom security policy on an example controller using modes of operation.

FIG. 1A is a conceptual diagram of an example system 100 for generating and implementing a custom context-based security policy on an example controller using modes of operation. The example system 100 includes a policy generation computer system 104 (e.g., computer server system, cloud computing system, client computing device) that is programmed to generate a custom security policy for a controller, an example IoT device 112 (e.g., ECU) that includes an example controller 114 that will use the generated security policy to operate securely and to prevent malware, and a management computer system 122 (e.g., computer server system, cloud computing system, client computing device) that is programmed to receive real-time controller information, to detect anomalous controller behavior, and to provide an interface for users to view real-time controller/device status information. Although not depicted, the system 104, the IoT device 112, and the system 122 can communicate over one or more communication networks, such as the internet, local area networks (LAN), wide area networks (WAN), virtual private networks (VPN), controller area networks (CAN), wired networks, wireless networks, mobile data networks, or any combination thereof.

The policy generation computer system 104 can receive controller software 102, which can include an operating system and/or applications that are to be run on a controller. The policy generation computer system 104 can use the controller software to automatically generate a custom context-based security policy 108 (with varying security levels for different modes of operation) for the controller that is to execute the software 102, as indicated by step A (106). For example, the computer system 104 can analyze the software 102 to determine an in-memory graph for the software that describes the flow of the software as it is being executed. The generation of this in-memory graph may be a static analysis of the code that generally does not change over the time software 102 is executing. The in-memory graph may be generated on a file-by-file basis, with addresses of instructions being recorded relative to the file's eventual location in memory, for example by using an offset value from the head of the file. Further, the computer system 104 can identify an inherent risk level for elements of that graph based on any of a variety of factors, such as memory modifications (e.g., write operation), types of memory modifications (e.g., modification using statically-defined values, modification of dynamically-defined values), memory allocation, function calls, jumps, and/or other features within each of the elements.

In the generation of the in-memory graph for the software, the computer system 104 can ensure that sufficient spare registers are available for use. For example, the spare registers are registers whose values can be changed by the calling code just before a return. This may be done, for example, by popping values from the stack (e.g., when the register is preserved during a function call) or setting the register value explicitly (e.g., when the register is used to return a value.)

To boost performance, code validating the return values in the in-memory graph (e.g., test code 338 described later) can use registers. To ensure sufficient register space for this use, the code analysis can include evaluating spare-register availability using static analysis. For example, if a function does not contain enough spare registers for use by the validation, additional registers may be allocated (e.g., saved on the stack).

The generation process can produce prolog/epilog instructions that preserve additional registers and, in some cases, eliminate required epilog instructions by merging additional registers into the register list of the original pop instruction.

In some cases, spare-register allocation may be done implicitly as a return instruction includes a pop instruction that typically contains popping not only pc, but also other preserved registers that may be used directly by validation code.

In some cases, return and pop may be different instructions, and each pop may pop only one register. The computer system 104 can attempt to find enough instructions occurring prior to the return operation, and relocate them to the validation code so that the validation process can use these registers before they are used for their original purpose. In checking for spare registers, the computer system 104 traces back from a return instruction until it finds enough register-sets instructions or until is reaches an unrelaocatable instruction.

A register-set instruction can include instructions that either explicitly set a register to a pre-determined value (such as 'mov eax, 1') or pops a value from the stack to the register (such as 'pop eax'). An unrelocatable instruction include an instruction that cannot be moved. This can be, for example, due to it being referenced as a jump destination or due to its referencing data relative to its own location.

In this flow control graph, for example, each node may represent a function (or other logical unit) of the software, with edges of the graph representing calls to other functions. The functions of the software may be examined to identify operations that provide some risk of in-memory attack (e.g., memory modifications, memory allocation, decryption and execution of encrypted code). Based on this examination, a risk level may be applied to branches with the node corresponding to the function. For example, if the function is found to have no operations that do not present risks of an in-memory attack, the node may be given the lowest risk level (e.g., "safe," a 0 rating). If the function is found to have operations that present significant risks of an in-memory attack, the node may be given a greater risk level (e.g., "risky," a 1 rating). Other risk levels (e.g., moderate risk, scores between 0 and 1) can also be determined, and/or other schemes for the in-memory graph may be used. For example, each node may represent a basic block of code without a memory jump, or may represent a single instruction. The flow control graph can be used to implement conditional IMV security on the controller 114 and the IoT device 112, more broadly.

The computer system 104 can assemble the custom security policy 108, which may include the in-memory graph with the risk ratings, as well as other data. For example, the custom security policy may specify multiple different IMV schemes that can conditionally be applied to portions of the controller software 102 based on factors, such as, code risk levels and/or a current context for the controller 114 and/or the IoT device 112. These different IMV schemes may involve different way of validating in-memory operations. Often, different IMV schemes will provide different trade-offs in terms of efficiency and security. For example, in some testing, it was found that one IMV scheme providing greater levels of security on a controller created a 20% increase in overhead while a lighter, less robust, and less secure IMV scheme was found to create a 6% increase in overhead. By selectively applying different IMV schemes on the controller 114 as appropriate (e.g., applying IMV schemes that correspond to risk levels), a controller's security and efficiency may be balanced and improved according to the operating needs of the controller in different circumstances.

Generating the security policy can additionally include generating one or more signatures for components of the controller software 102, such as processes/functions that are part of the software 102, and that can be used to verify that the code being executed as part of the software 102 is authentic and has not been modified/altered/replaced by malware. By automatically generating a security policy 108 from the controller software 102—meaning without needing manual design for implementation/generation—the system 100 can reduce the burden, cost, and time to generate and implement security layers on controllers, which can increase controller security.

The policy generation can be performed by the computer system 104 in a way that does not necessitate any sort of modification to the controller software 102. For example, the custom policy 108 can be separate from and not rely on modification of the software 102 in order to operate. By generating and implementing the security policy 108 without having to modify or alter the controller software 102, the system 100 can additionally reduce the burden on security layer implementation, which can increase security layer implementation and overall controller security. For example, if the controller software 102 were to be modified in significant ways in order to incorporate the security policy 108, the software 102 would need to be verified and tested again after the security policy 108 has been integrated into the system, which can slow time to deployment and can delay the incorporation of security layers on controllers.

The computer system 104 (and/or other computer systems, such as original equipment manufacturers (OEM)) can load the software 102 and the security policy 108 for the controller 114 of the IoT device 112, as indicated by step B (110). For example, the controller software 102 and the security policy 108 can be flashed onto the controller 114.

The controller 114 can securely operate using the controller software 102, which is confined to operating within the confines of the security policy 108, as indicated by step C (116). For example, the security policy 108 can include rules outlining various security features to use during particular operating conditions within the controller 114, such as implementing different IMV schemes depending on assessed risk levels. For instance, the controller 114 can determine risk levels for particular functions based on a variety of factors (e.g., risk level assessed from in-memory graph analysis) and can apply a variable level of IMV checking based on the determined risk levels. If, for example, a particular function is determined to be "safe" and have a low risk level—meaning that there is a low likelihood that the particular function could pose a security vulnerability—the controller 114 can execute the particular function without IMV checking. If the function is determined to have a high risk level—meaning that the function includes one or more features that could be exploited and pose a security risk to the controller 114—the controller 114 can execute the function with one or more levels of IMV checking.

Such hardening of the controller 114—meaning using conditional levels of IMV checking by the controller 114 as outlined in the security policy 108, which can outline and implement other security features on the controller 114—can provide memory security that provides a variety of benefits. For example, it can identify and prevent attacks before they are able to install/run malware 120 on the controller 114 because the controller is prevented from reading or executing instructions that are outside of the memory ranges in which the control software 102 is loaded.

The controller 114 can log information about its operation, including blocked out-of-range attempts as well as information on secure operation of the controller 114 over time, including contexts for the controller 114 and the device 112 while various processes are executed, and the mode of operation that the controller 114 and/or the device 112 were operating in. Traces of blocked malware attempts can include a variety of information, such as the malware itself, the origin of the malware (e.g., IP address from which the malware originated), the context of the device 112 and/or controller 114 when the malware attempt was blocked, the mode of operation for the device 112 and/or the controller 114, and information identifying the code segment that provided the malware exploit. The controller 114 can report information on controller operation, as indicated by step E (124). Such reporting can be provided in real-time. For example, the controller 114 can report malware traces in response to the malware 120 attempt being blocked. The controller 114 can balance reporting with controller performance against the timeliness of reporting for less critical information, such as information about secure operation of the controller 114 during periods of time when no malware attacks were attempted/blocked. For instance, such reports can be delayed until periods of time when the controller 114 and/or the device 112 have at least a sufficient amount of processing capacity and/or network bandwidth available.

The management computer system 122 can receive reports from the controller 114 as well as from multiple other controllers and devices, and can aggregate the reports into a central database system. The reports can be used to provide real-time controller/device information, as indicated by step E (126). For example, the computer system 122 can transmit real-time information that is presented on client computing devices (e.g., mobile computing devices, laptops, desktop computers) in user interfaces, such as the example user interface 130 that includes status information 132 for example controllers C1-C6 and malware information 134 that identifies particular malware that has been blocked by these controllers, as well as other information (e.g., device/controller context when the malware was blocked). The real-time information can be at any of various levels of granularity, such as a device-level (status information for a specific device) and/or a population-level (status information across multiple devices/systems).

The computer system 122 can additionally use the information reported by controllers to detect anomalies, as indicated by step E (128). For example, the computer system 122 can use statistical analysis to identify operation/behaviors that are outside of the normal operation of a controller, such as identifying a particular context for a particular process that is a statistical outlier outside of the normal operation of a controller.

Figure 1B:
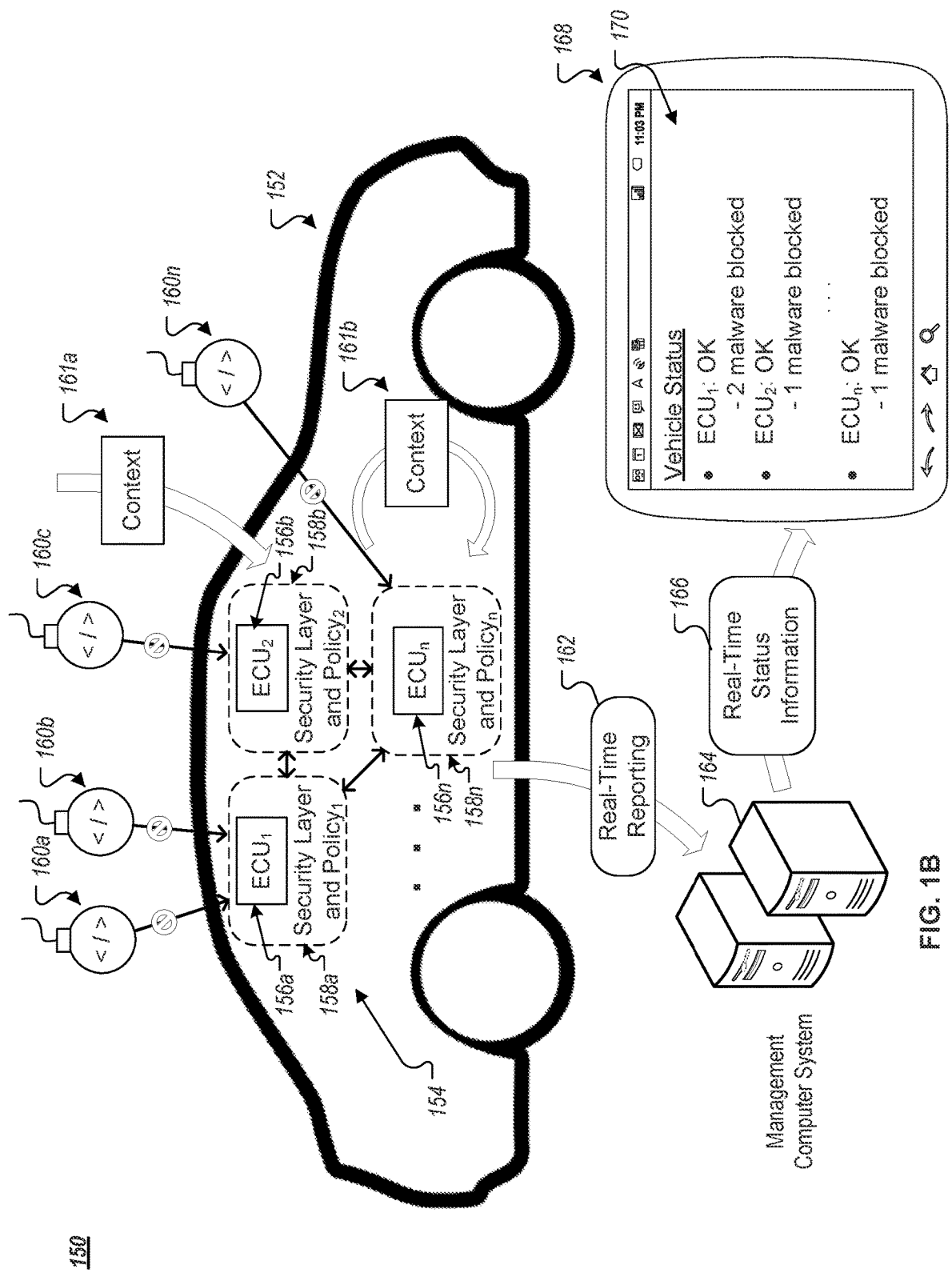
FIG. 1B is a conceptual diagram of an example system for generating and implementing custom security policies on example ECUs that are part of an example vehicle.

FIG. 1B is a conceptual diagram of an example system 150 for generating and implementing custom context-based security policies on example ECUs that are part of an example vehicle 152. The example system 150 is an example implementation of the system 100 to a specific IoT context, which in this example is the vehicle 152. The system 100 and the system 150 can be implemented on a variety of other IoT devices and systems.

In this example, the vehicle 152 includes a control system 154 that includes multiple ECUs 156*a-n* that each have their own custom security policy 158*a-n*, which each define in-memory graphs and risk levels for the processes. Although not depicted, the security policies 158*a-n* can be generated in a similar manner described above with regard to FIG. 1A and the policy generation computer system 104. The security policies 158*a-n* can harden the ECUs 156*a-n* and can effectively block malware attempts 160*a-n*, which can be attempts by hackers to find a way into the CAN Bus of the vehicle 152. While the vehicle 152 can include over a hundred ECUs connected to the CAN Bus, only a few may be open externally (accessible to external networks outside of the vehicle 152, such as the internet). These external ECUs (e.g., ECUs 156*a-n*) can be the gateways into the car and the security policies 158*a-n* can stop attackers at these gateways, which can significantly reduce, if not eliminate, the risk of attacks penetrating the car's network, which can disrupt the car's operation.

For example, the security policies 158*a-n* can identify portions of code to which IMV checking is to be applied and levels of IMV checking that are to be used, under various operating conditions, in order to ensure that out-of-range memory is not read or executed while at the same time minimizing the impact on controller performance. By doing so, malicious code may be prevented from running on the ECUs 156*a-n* while having minimal performance impact on the ECUs 156*a-n*. By using the security policies 158*a-n* that are specific to the ECUs 156*a-n*, any processes or functions that are outside of the ECUs permitted/designed operating behavior can be immediately detected and stopped from running on the ECUs 156*a-n*. This can allow for the ECUs 156*a-n* to stop malicious code from ever being executed by and possibly taking control of an ECUs' operation.

For instance, hackers targeting the vehicle 152 can use a "dropper," which is a small piece of code or operation, to try to exploit a vulnerability and implant the malware 160*a-n*. The malware 160*a-n* is the code that ultimately tampers with or takes control of the function of the vehicle 152, which can cause significant damage and put the safety of the driver and others on the road at risk. By adding an endpoint security layers and policies 158*a-n* to ECUs 156*a-n* so that they use policies outlining conditional IMV checking, the ECUs 156*a-n* are able to detect the unexpected behavior or operation of a dropper and immediately report on the attack attempt in real-time, as indicated by step 162. The early warning can give the original equipment manufacturers (OEMs) and system providers of the vehicle 152 (and its subparts) time to address the threat, as indicated by the computer system 164 providing real-time status information to a client computing device 168 with information 170 on malware that has been blocked across the ECUs 156*a-n* (step 166). For example, an alert on the malware 160*a-n* can include the complete trail of the attack on the ECUs 156*a-n*, including its source, path, and context of the vehicle 152 and/or ECUs 156*a-n* when the attack was blocked, so vulnerabilities can be fixed and blocked to prevent any malware from infiltrating the CAN Bus on the vehicle 152.

Dropper and other hacker attempts to introduce the malware 160*a-n* on the externally connected ECUs 156*a-n* can be detected by the endpoint security layers and policies 158*a-n* as foreign code based on attempts to read or execute out-of-range instructions. Additionally, these attempts can be detected using conditional IMV checking so as to have minimal impact on the performance of the ECUs 156*a-n*.

Endpoint security layers (e.g., security policy 108, security layer and policies 158*a-n*) can be implemented on newly deployed controllers and can be retrofitted on previously released controllers that may not have previously included security layers. Such retrofitting can improve the security of devices already in use and can be added as part of regular software updates that drivers receive during regular maintenance and updating. Once retrofitted, previously deployed controllers can be protected with endpoint security and will be hardened against the cyber threats targeting them.

Figure 2:
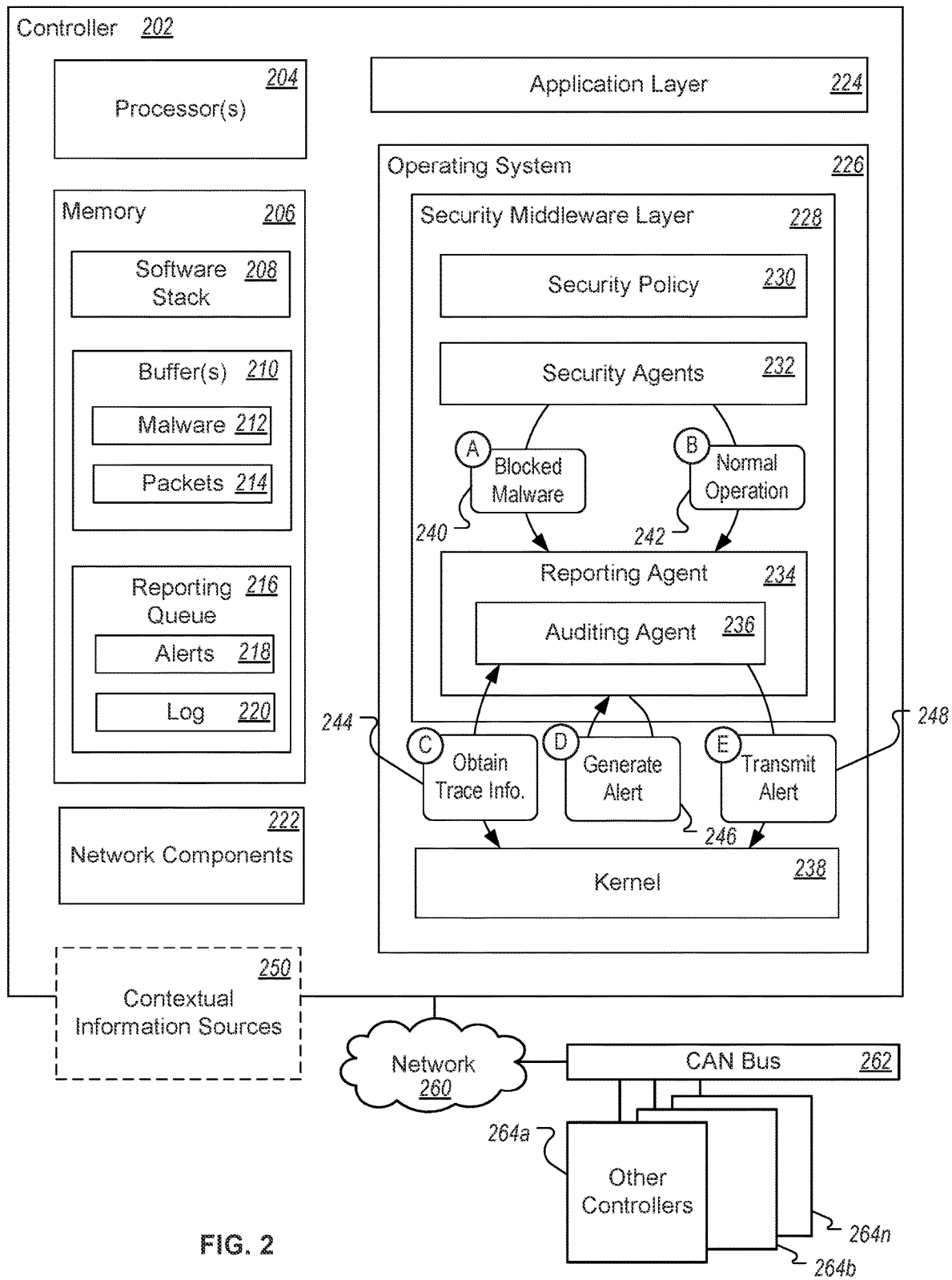
FIG. 2 is a diagram of an example system for processing and providing controller security information.

FIG. 2 is a diagram of an example system 200 for processing and providing controller security information. The example system 200 includes a controller 202 that can be similar to the controller 114 protected by security policy 106 and the ECUs 156*a-n* protected by security policies 158*a-n* described above with regard to FIGS. 1A-B.

The controller 202 includes an application layer 224 at which one or more applications operate on the controller 202 through use of an operating system 226 for the controller 200. The operating system 204 includes a kernel 238 and the security middleware layer 228, which can intercept commands from the application layer 224 to the kernel 238 for inspection, alteration, or prevention.

The kernel 238 includes processes and functions that provide an interface for the operating system 226 to perform operations on the controller 202 using hardware, which includes one or more processors 204 (e.g., CPUs), memory 206 (e.g., volatile memory, non-volatile memory, RAM), and input/output (I/O) network components 222 (e.g., wired and wireless network cards/chip sets, network interface cards (NIC)). The kernel 238 includes functions/process that direct operation of the hardware, such as program loading (e.g., functions and processes to load processes into a software stack 208 in memory 206 for execution by the processor(s) 204), in-memory services (e.g., functions that modify memory 206, functions to allocate information into and out of memory 206), networking services (e.g., processes to open network sockets and to transmit/receive network packets), and peripheral device processes (e.g., processes to interface with peripheral devices).

The security middleware layer 228 includes security agents 232 that can provide multiple different layers of security and that can implement various portions of the security policy 230 on the controller 202. The security agents 232 can, for example, apply conditional IMV checking to implement different IMV schemes, as appropriate, to calls from the application later 224 to the kernel 238. For calls that pass the conditional IMV checking, the security middleware layer 228 can permit the call to pass. As described above, for some functions no IMV checking will be performed and the security middleware layer 228 will permit the call to pass without any IMV check. However, other calls can have one or more levels of IMV checking applied depending on the determined risk level for the function, and will need to pass the determined IMV check in order for normal processing flow for the controller to continue (e.g., return processing flow to code that called a function under evaluation). For calls that fail the IMV checking, the security middleware layer 228 can take one or more corrective actions. These corrective actions can include block the call from reaching the kernel 238, halting the application layer 224 code, generate alerts, and other actions.

The security middleware layer 238 includes a reporting agent 234 that can collect and report forensic information and alerts on security threats, such as malware dropping attempts, as well as information on normal operation of the controller 202. The security middleware layer 228 can harden the controller 202 against malwares and other security threats, and can be integrated into the operating system 226 of the controller 202, in kernel and system levels, which can include enforcement as well as reporting and forensics capabilities through the reporting agent 234. For example, the security middleware layer 228 (and/or its individual components) can be registered as one or more drivers with the kernel 238 to be executed in response to various action being performed at a kernel level, such as particular functions that are part of the kernel processes being called.

The reporting agent 234 can incorporated into the security middleware layer 228 by, for example, being invoked/called by the security agents 232 whenever the security agents 232 block malware attacks, as indicated by step A (240), and/or at various intervals (e.g., time-based intervals, code/processing based intervals) whenever they determine that the controller is operating normally (no malware attack detected), as indicated by step B (242). The reporting agent 234 can collect forensic trace information on system workflows within the controller 202. This collection can be automatically adjusted and optimized based on controller 202 performance, memory usage, and/or storage limitations. The reporting agent 234 can be designed to obtain and report relevant information, but to also do so while minimally impacting performance of the controller 202. Periodically and upon attack attempts, the forensic information is reported to a server system (e.g., management computer system 122, management computer system 164) for reporting and further analysis and/or is used for generating alerts and providing the alerts to one or more other controllers (e.g., other controllers 264a-n, in communication with the controller 202 over the CAN Bus 262 and the network 260).

For example, the reporting agent 234 can automatically analyze attack attempts (blocked malware 240), including identifying the attacker's entry point (exploit in the operating system 226) and reporting that information to the vendor to be addressed and fix the vulnerability. The reporting agent 234 can further include an auditing agent 236 that is an internal component that collects activity traces, stores them in a queue 216 (e.g., compressed cyclic buffer) for transmission, and sends them, when needed, to the backend server system (management computer system 122, management computer system 164), which may reside on either a security provider's data center or at a vendor/manufacturer's data center.

For example, in response to receiving an indication that malware has been blocked (240) and/or that the security agents 232 have determined the controller 202 is operating normally (242), the reporting agent 234 can request the auditing agent 236 to obtain trace information, as indicated by step C (244). Obtaining trace information can involve the auditing agent 236 transmitting requests to the kernel 238 for information that is stored in memory 206, including information contained within the software stack 208 indicating processes that are being performed by the controller 202 (as well as a sequence of processes that are being performed) and/or information that has been blocked by the security middleware layer 228 that is stored in one or more buffers 210 used by the controller 202 (e.g., blocked malware 212, blocked network packets 214).

The auditing agent 236 can additionally call to the kernel 238 to obtain information on the current state of the controller 202, such as current resource usage (e.g., processor 204 usage, memory 206 usage, network transmission levels using the networking components 222) and/or current network connections established by the network components 222 (e.g., Wi-Fi, cellular network).

The auditing agent 236 can call to the kernel 238 to obtain information on a current context within which the controller 202 currently exists/resides, which can be a broader external state beyond than the current internal state of the controller 202. For example, the current context can include information about a device/system that the controller 202 is controlling (e.g., infotainment center in a vehicle), information about a broader system of which the controller 202 is a part (e.g., collection of ECUs that together provide control operations within a vehicle), and/or other appropriate information. Obtaining context information may include accessing contextual information sources 250 through the kernel 238. Contextual information sources 250 may be local to the controller 202 or they may be external, such as being provided by one or more other controllers that are part of a system that the controller 202 is a part of (e.g., collection of ECUs in a vehicle). Such information can include, for instance, a current physical location (e.g., geolocation), a current operational state of the system (e.g., vehicle driving, vehicle idling), and/or other appropriate context information.

Having obtained relevant information, the reporting agent 234 and the auditing agent 236 can generate an alert (for blocked malware attempts), as indicated by step D (246). Alerts, for example, can be used to provide information to a backend system (management computer system 122, management computer system 164) about a current state of the controller 202, which can be combined with information from other controllers to provide a global view of the security state of a population of controllers/devices. As another example, alerts can be provided over the network 260 to one or more other controllers 264a-n that are connected to the controller 202 by the CAN Bus 262. In response to receiving one or more alerts 218 from the controller 202, for example, another controller (e.g., one or more of the other controllers 264a-n) may enter a safe mode in which operations are restricted to a subset of normal operations, until such time that any possible security breach can be resolved.

Generated alerts can be transmitted (e.g., to one or more other controllers and/or a backend system), as indicated by step E (248). For example, the alerts 218 can be loaded into the reporting queue 216 and the log entries 220 can be loaded into a reporting queue 216. The reporting queue 216 can be designed to handle alerts 218 differently than log entries 220, and may prioritize the transmission of the alerts 218 over the log entries 220. For example, the reporting queue 216 can transmit the alerts 218 immediately upon receiving them and regardless of a current capacity of the network components 222. In contrast, the log entries 220 (detailing normal behavior) can be entered into a buffer that is flushed at appropriate times, such as when the network components 222 have sufficient capacity to transmit the contents of the buffer. The buffer may have a limited or fixed size, and allow for non-transmitted log entries not yet transmitted to be overwritten with new log entries in the event that the network components 222 did not have sufficient capacity while the non-transmitted log entries were awaiting transmission in the buffer. Since log entries 220 are not as critical as the alerts 218, losing some log entries 220 in order to reduce performance impacts on the controller 202 (e.g., minimize memory usage for log entries 220, restrict network transmissions to times when the networking components 222 have sufficient capacity) can be a fair tradeoff. In contrast, alerts 218 can be prioritized and may not be dropped in lieu of system performance gains.

In addition to including a variety of information, such as trace information, controller information, and/or context information, the alerts 218 can include actual copies of the blocked malware 212 and/or blocked network packets 214. Such information can be used by the backend system to better understand the security threat that was blocked and the exploit in the operating system 226 that permitted the security threat to reach the controller 202. As another example, alerts 218 that may be provided to the other controllers 264a-n may exclude copies of the blocked malware 212 and/or blocked network packets 214, as such information may not be used by the other controllers 264a-n.

Although not depicted, the reporting agent 234 and the auditing agent 236 can additionally include features to compress the size of alerts and logs that are transmitted to the backend system. For example, the reporting agent 234 and the auditing agent 236 can compress the information being transmitted using one or more data compression techniques, such as through using a dictionary to abbreviate particular common bits of information with less information. Other compression techniques can also be used.

Figure 3:
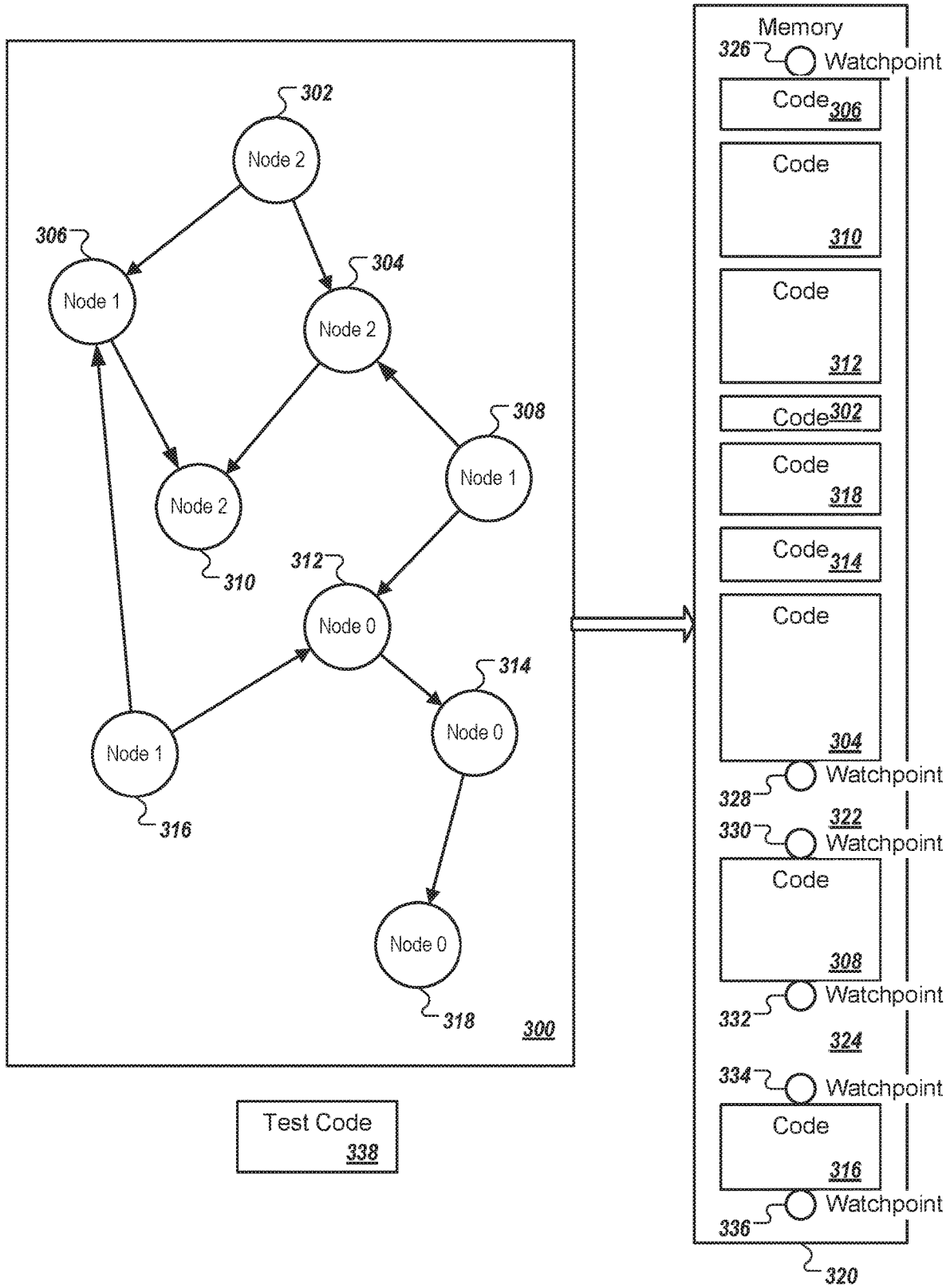
FIG. 3 is an example diagram of an in-memory graph of software stored in memory.

FIG. 3 is an example diagram of an in-memory graph 300 of software stored in memory 320, which can be used to assess risk levels for implementing conditional IMV on the software. For example, the in-memory graph 300 may be created as part of the security policy 106 generation for the controller software 102 by the computer system 104, and/or can be created/monitored during runtime for the controller software 102. The in-memory graph 300 may be used, for example, by the controller 202, with the memory 320 being, for example, a part of the memory 206. The in-memory graph 300 can be used, for example, to assess risk levels of various parts of the controller software 102, which can be used to determine and implement an appropriate IMV scheme to be applied to the part of the controller software 102 during runtime.

The in-memory graph 300 can be created to reflect the order of operations that are possible with the software stored in the memory 320. For example, the software can be stored in memory 320 and can include distinct portions 302-318 (e.g., functions). The in-memory graph 300 can be created to include nodes 302-318 that correspond to the portions 302-318. The edges of the flow control graph 300 can represent jumps from one portion to another, such as functions calling each other. For example, control can flow from portion 302 to either portion 304 or 306—meaning that code within portion 302 can call portions 304 and/or 306. As such, there are edges in the flow control graph 300 from the node 302 to the nodes 304 and 306. The flow control graph 300 can take any technologically appropriate form for use in a computing system. For example, the graph 300 may take the form of a list of edges, as an adjacency matrix, an adjacency list, and/or other appropriate data structure to represent the graph 300.

Risk levels for each of the nodes 302-318 can be determined, in part, based on a variety of intrinsic factors within each of the code portions (e.g., operations that are performed by each of the corresponding code portions) and/or extrinsic factors for each of the code portions (e.g., relationships/connections with code portions). Risk levels assessed for the nodes 302-318 can indicate the risk of in-memory attack to the corresponding code portions 302-318 stored in memory 320. In this example, there are three levels of risk, with 0 indicating low risk or no risk, and a 2 indicating the highest level of risk. These risk levels are determined, for example, by the computer system 104 based on an analysis of the instructions within the software portions 302-318. In other examples, more or fewer levels of risk may be used, and they may be recorded using numbers or other indicia such as character strings.

In some cases, the possible return addresses of a particular code portion 302-318 may be used to classify risk levels. For example, if all a code portion 302-318 only returns or jumps to addresses explicitly saved in a memory register, and that register is only capable of holding known-safe addresses, the code portion 302-318 can be classified based on this knowledge. That is, the code portion 302-318 could be classified as, for example, medium or low-risk instead of high-risk.

Various heuristics may be used to identify the risk of in-memory attacks for each of the code portions 302-318. One such heuristic can include the presence instructions that modify memory (e.g., writes operation), either directly in each code portion or by calling other code portions that modify memory. In such an example, memory modifications operations in general can pose potential security risks that could potentially be exploited, and can be a potential indicator of risk. In some instances, the type of memory modification that is being performed can be evaluated to determine whether the code portion including the memory modification poses is risky. For example, memory modification operations that use values (e.g., value to be written, memory address to be modified) statically defined at compile time may be less risky than other memory modification operations that use one or more dynamically defined values at runtime, such as values that are calculated by the code at runtime (as opposed to at compile time) and/or that use values passed into the code portion, such as parameters from another function and/or other input data. Accordingly, code portions can be assigned a risk level based on whether a memory modification operation is present as well as the type of memory modification that is being performed (e.g., modification using statically-defined values, modification using dynamically-defined values). For example, code portions that include memory modification operations using one or more dynamically-defined values (e.g., value to be written, memory address to be written), can be assigned a high risk level. Code portions that do not include memory modification operations or that include memory modification operations using only statically-defined values, but that directly or indirectly call a high risk level code portion can be assigned a medium risk level. Code portions that do not include memory modification operations or that include memory modification operations using only statically-defined values, and that do not directly or indirectly call a high risk level code portion can be assigned a low risk level. Additional levels of risk and/or ways to assign risk levels can also be used, for example, in some instances code portions that include memory modification operations using statically-defined values can be assigned a medium risk level (or a different risk level between low risk and high risk) regardless of whether they indirectly or directly call a high risk code portion.

Referring to FIG. 3 to illustrate an example of assigning risk levels to the code portions 302-318, the code portions that do not modify memory or that modify memory using only statically-defined values, and that do not call any code portions that modify memory using dynamically-defined values can be determined to have a risk level of 0 (low risk level), as is done for example nodes 312, 314, and 318. If a code portion 302-318 does modify memory (e.g., perform a write( ) or other memory modification operation) using dynamically-defined values, then the code portion can be determined to pose a high-level of risk and a corresponding node 302-318 can be assigned a risk level of 2. For instance, in this example nodes 302, 304, and 310 are assigned a risk level of 2. If a code portion 302-318 does not modify memory or modifies memory using only statically-defined values, but does directly or indirectly call another code portions that does modifies memory (e.g., perform a write( ) or other memory modification operation) using dynamically-defined values, the corresponding node 302-318 can be determined to have a medium level of risk and can be assigned a risk level of 1. For example, nodes 306 and 308 directly call nodes 310 and 304 (which have a risk level of 2 since they include memory modification operations), respectively, and are assigned a risk level of 1. Node 316 indirectly calls node 310 (via node 306) and, accordingly, is also assigned a risk level of 1 since execution of the code portion 316 can lead to execution of the code portion 310, which modifies memory.

As an example, code portion 302 (e.g., function) may include code that modifies a portion of memory 320 using a value that is either calculated during runtime or input to the code portion 302 (e.g., user input, parameter passed from another function, input from another device or system). As such, the code portion 302 can be determined to pose a high level of risk and the node 302 can be assigned highest risk value of 2. Code portion 316 may not modify memory itself, but it may indirectly call another code portion 310 that modifies memory 320 using dynamically-determined values. As such, the code portion 316 can be determined to present a medium level of risk and the corresponding node 310 can be assigned the medium risk value of 1. Code portion 318 does not modify memory or performs a memory modification operation using only statically-defined values, and does not call any functions that modify memory using dynamically-determined values. As such, it can be determined to have a low level of risk and can be assigned the lowest risk value of 0.

Additional and/or alternative heuristics models can be taken into account when assessing risk levels for code portions represented by the nodes 302-318 in the graph. For example, risk levels can additionally and/or alternatively be determined based on heuristics, such as performing memory allocation operations, examination of the instructions that pass control and parameter checking for the code that receives control, and/or whether the code creates a new thread of control. For example, risk levels can alternatively and/or additionally be determined based on whether code portions allocate memory, either directly in each code portion or by calling other code portions that allocate memory. In such an example, memory allocation operations can pose potential security risks that could potentially be exploited and that can be used to augment risk levels determined based on memory modifications. Accordingly, if a code portion 302-318 does not allocate memory and does not call any code portions that allocate memory, then the corresponding node 302-318 can be determined to have a low risk level based on memory allocation risk, and the determined risk level for the corresponding code portion can be unchanged by this determination. If a code portion 302-318 does allocate memory (e.g., perform a malloc( ) or other memory allocation operation), then the code portion can be determined to pose a high-level of risk based on memory allocation risk and the determined risk level can be enhanced (e.g., increment risk level) and/or automatically set to a high risk level (e.g., assign risk level of 2). If a code portion 302-318 does not allocate memory but does directly or indirectly call another code portions that does allocates memory (e.g., perform a malloc( ) or other memory allocation operation), the risk level for the corresponding node 302-318 can be enhanced (e.g., increment risk level) and/or automatically set to a medium level of risk (e.g., assign a risk level of 1). As will be described later, different IMV schemes can be applied to different portions 302-318 based on the risk value of the corresponding nodes 302-318.

As another example, code portion 302 (e.g., function) may include code that allocates unallocated memory 322. As such, it can be determined to pose a high level of risk and the node 302 can be assigned highest risk value of 2. Code portion 316 may not allocate memory itself, but it may indirectly call another code portion 310 that allocates unallocated memory 324. As such, it is determined to present a medium level of risk and the corresponding node 310 can be assigned the medium risk value of 1. Code portion 318 does not allocate memory and does not call any functions that allocate memory. As such, it can be determined to have a low level of risk and can be assigned the lowest risk value of 0.

In the example depicted in FIG. 3, control should never pass to memory 322 or 324, as those portions of memory 320 does not contain known-safe code that is part of the code portions 302-318, which may be, for example, installed by the OEM as previously described. However, one method of attacking the software stored in memory 320 is to load executable code into the memory 322 or 324 and to cause that memory to gain control so that it is executed. This type of attack is sometimes called code injection, in memory, or an out-of-range attack. Due to, for example, flaws in the software, attackers may find a way to cause control to attempt to jump to memory 322 or 324, such as through modifying memory using dynamically input/determined values and/or through performing memory allocation operations. However, IMV schemes can be applied to the execution of the code portions 302-318 to prevent or minimize such attacks.

While IMV could be applied to each of the code portions 302-318 to ensure valid in-memory operation passing between the code portions 302-318 according to the edges between the nodes in the in-memory graph are followed—meaning that jumps and returns between the code portions 302-318 are contained within the permitted behavior identified in the in-memory graph—such global application of IMV to the code portions can have a significant performance hit on the operation of the controller. Instead, as described throughout this document, different IMV schemes can be applied separately to the individual code portions 302-318 based on the corresponding risk level. For example, a first IMV scheme implementing a full IMV check—meaning jump and return address verification—can be performed for high risk code portions (e.g., code portions 302, 304, 310). A second IMV scheme implementing a partial IMV check—meaning that the call to jump to another code portion can be verified for one or more details (e.g., verify that it is a function being called, verify the name of the function is known)—can be performed for medium risk code portions (e.g., code portions 306, 308, 316). A third IMV scheme implementing no IMV check—meaning that no additional processing is performed to verify jumps or returns—can be implemented for low risk code portions (e.g., code portions 312, 314, 318). The performance hit on the processor can be the most significant with the first IMV scheme, which will have to retrieve permitted jump and return locations for a code portion, identify their current location within the memory 320, and then verify the locations in memory 320 before permitting the processing flow to continue. The second IMV scheme can additionally have a performance hit, but it can be much less significant than the first IMV scheme since the call itself can be verified, for example, without retrieving and determining additional information to perform the verification. While the second IMV scheme may not provide the same level of security as the first IMV scheme, it can ensure that processing is flowing to a code portion (e.g., a function, although the specific function may not be verified) instead of to other parts of memory 320, such as memory 322 or 324. The third IMV scheme can have no performance hit on the controller, but can also provide no security protections. By being selectively allocated to code portions based on assessed risk levels, these example IMV schemes can, in aggregate, maximize the security on the controller while minimizing the performance hit on the controller to implement the protections.

In addition to or as an alternative to the other techniques described here, watchpoints can be used to enhance the security of a controller. For example, watchpoints can be break points set in the hardware of a computing system that interrupt the control of executing software when the control passes to a memory address where the watchpoint was set. For example, watchpoints can be used with debuggers such that when processing flow reaches a watchpointed memory address, processing flow can stop and appropriate action can be taken, including continuing operation of the code. Watchpoints can also be set at the beginning and end of buffers to signal buffer overruns, such that if a watchpointed memory address is written to outside of the buffer, a security issue may be identified and a corrective action may be taken. As shown in FIG. 3, watchpoints 326-336 can be set in the memory 320 before and after the contiguous group of code portions 302-318, and can be used to generate alerts in the event that processing flow extends outside of the code portions 302-318.

The watchpoints that are available on a controller can be limited in number, depending on the hardware or other system/device limitations. For example, some hardware only permits four watchpoints. Watchpoints may be dynamically moved as software executes, though. For example, the security agents 232 can be programmed to dynamically move watchpoints within the memory 320 as processing flow across the code portions 302-318 progresses. For example, the security agents 232 can dynamically set and unset watchpoints based on, for example, risk levels associated with the code portions 302-318, such that watchpoints are assigned at or around code portions that are currently being executed and that are determined to have high risk levels. Other techniques and factors for allocating a limited number of watchpoints across the memory 320 are also possible.

In addition to using hardware watchpoints, which are hardware memory modification monitors, memory modification monitors can also be implemented in software, which can include software checks being be executed at defined time moments (e.g., when some syscalls are performed) to ensure memory overrun didn't happen. Unlike hardware watchpoints, software watchpoint checks may, in some instances, be too late to prevent memory overruns and may be triggered after the memory modification has already caused bad code execution (instead of being triggered by the memory modification request itself, as with hardware watchpoints). However, in the case of limited set of hardware watchoints such software wachpoint checks may be performed to check structures that are considered as having less risk of attack while hardware watchpoints can be allocated to protect against the riskiest code portions at a given moment. For instance, if a function allocates memory, it is likely that this function will then proceed to access this newly allocated memory region at that point in time. Accordingly, the newly allocated memory region can be considered to currently be the greatest risk attack target and the hardware watchpoints can be allocated to protect this newly allocated memory. In this example, the software watchpoint checks can be applied for "older" previously allocated regions of memory.

In some cases, shared parts of validation code can be unified for different watchpoints 326-336 and/or code portions 302-318. For example, test code 338 can store computer-readable instructions for performing IMV testing. In some cases, code portions with the same transitions may have their test codes combined in the test code 338. For example, test code for node 306 can be used to ensure that the return address of code portion 310 is returned. As shown in FIG. 3, code portion 304 likewise should transition only to the same code portion 304. As such, the test code used to test code portion 306 may also be used to test for code portion 304, as both code portions 306 and 304 should only transition to code portion 310.

In some cases, test code for code portions may be generated based on a union of permitted transitions for combined code portions. For example, code portion 308 has a valid transition to code portion 312. Code portion 302 has valid transitions to code portions 304 and 306. As such, as single test code could check for transitions to code portions 304, 306, and 312. This single test code could be used to check both code portion 302 and code portions 308.

In some cases, short functions can be copied directly to validations stubs of the test code 338. For example, the test code 338 can contain one or more validation stubs that intercept function calls, jumps, returns, etc., and these validation stubs may contain the instructions to test the intercepted action for IMV. In some cases, the contents of short code portions 302-318 may instead be copied directly into the test stubs. In these cases, the program flow thus jumps directly to the validation stub, instead of first jumping to the original code portions 302-318 and then to the test code 338. In this way, efficiency of the code may be advantageously advanced in a way that reduces computing resources necessary for solving potential security problems.

In some cases, label/tagging may be used in some, but not all, situations in which a function uses at table calls. In some implementations, if a table call is found in a code portion 302-318, the test code 338 can generally include a label for that table call. However, in specific cases in which can be used if and only if the register of the table can contain only one pointer in the corresponding code portion's 302-318 offset table, then no corresponding label is used in the test code 338.

FIGS. 4A-B are flowcharts of example processes 400 and 450 for implementing conditional in-memory validation on a software controller. The processes 400 and 450 can be run on any of a variety of systems, such as the systems 100, 150, 200, and 300, and/or controllers, such as the controller 114, the ECUs 156*a-n*, the controller 202, the controller using the memory 320, and/or other controllers and/or systems. The processes 400 and 450 are described below with reference to some of these systems, controllers, and components, but can be applied to any appropriate system, controller, and/or component.

Referring to FIG. 4A, the example process 400 is depicted for generating a security policy for a controller that can be used to implement conditional IMV at runtime on a controller. The example process 400 can be performed, for example, as part of the security policy generation described above with regard to the policy generation computer system 104. For example, the policy generation computer system 104 can determine initial/baseline security risks posed by various code portions, can identify conditions on the controller that may elevate and/or decrease those risk levels, and can store those risk levels and conditions as part of the security policy 108 that can be implemented at runtime by the controller 114.

Static analysis of the controller code can be initiated (402), and from the static analysis an in-memory graph of the code portions in the controller software can be built (404). For example, the computer system 104 can perform static analysis on the controller software 102 and, from the static analysis, can build an in-memory graph of the different functions (example code portions) that call each other, as depicted in FIG. 3, for example.

First code portions that modify memory can be identified (406). For example, the computer system 104 can identify functions that make system calls to modify memory, such as write( ), and/or other memory allocation operations, which may vary across different coding languages and on different operating systems. In some instances, the first code portions may be limited to those portions that perform memory modification operations using values that will be dynamically determined during runtime (as opposed to being statically defined at compile time). Such determinations can be made by evaluating how one or more values (e.g., value to be written, memory address) used to modify memory are determined in the compiled code. If any of these values are determined during runtime as opposed to be being statically defined in the compiled code, they can be identified as a first code portion. Referring to the example above in FIG. 3, the example code portions 302, 304, and 310 are identified as including memory modification operations. Nodes 302, 304, and 310 corresponding to the code portions 302, 304, and 310 can be tagged by the computer system 104 as being first code portions that include memory modification operations.

Second code portions that call the first code portions can be identified (408). For example, the computer system 104 can use the in-memory graph and the directional edges between the nodes to identify other nodes that call the first code portions. Referring to the example above in FIG. 3, the computer system 104 can start at each of the nodes tagged as having memory modification operations (nodes 302, 304, and 310), and can walk through the graph backward along each of the directional edges that point to those nodes. Any other node that is included in this reverse walk through the in-memory graph can be identified as a second code portion. For example, starting with the node 302, there are no edges in the graph that point to it, so there is no reverse walking to perform for this node. Moving on to the node 304, there are two edges that point to this node—the edge from the node 302 to the node 304 and the edge from the node 308 to the node 304. Since the node 302 is already identified as having a memory modification operation, the edge between the nodes 302 and 304 can be ignored. The node 308, however, can be identified as a second code portion since it does not include a memory modification operation. Edges pointing to the node 308 can then be analyzed to continue the reverse walk, but in this example the node 308 does not have any edges pointing to it, so the reverse walk emanating from the node 304 can stop. The reverse walk can then continue with the node 310, which has edges pointing to it from the node 304 (which can be ignored, as described previously) and from the node 306. The node 306 can be identified as a second code portion based on its edge pointing to the node 310, and then edges pointing to the node 306 can be analyzed as part of the revers walk. In the depicted example, an edge from node 302 (which can be ignored, as described previously) and an edge from node 316 point to the node 306, which can cause the node 316 to additionally be identified as a second code portion. Since no other nodes point to the node 316, the reverse walk can be concluded.

Other risk-based heuristics for the code portions can be identified (410). For example, as described above, there can be other types of heuristics that may additionally and/or alternatively be taken into account when determining risk levels for code portions, such as the parameters that are passed into a function as part of a function call, the function's parameter checking and verification procedures (e.g., checking size constraints on functions), whether the functions call or use any network operations, function pointers, buffer allocations in-memory, any memory address that is being passed as a parameter, and/or other factors.

Risk levels for the code portions can be determined (412). For example, as described above with regard to FIG. 3, the example first code portions (nodes 302, 304, and 310) can be determined to have a highest risk level. The second code portions (nodes 306, 308, 316) can be determined to have a medium risk level. Third code portions (nodes 312, 314, 318)—those that are not identified as either the first a second code portions—can be determined to have a low risk level. Other risk levels and ways for assessing risk levels can also be used.

Conditions for risk level modifications for the code portions can be identified (414). For example, if a current security threat to the controller is identified (e.g., an attempt to load malware onto a controller is detected and blocked), then each of the determined risk levels for code portions can be elevated in response to that condition (current security threat). Elevated risk level can include, for example, elevating low-risk processes to medium-risk processes, medium-risk processes to high-risk processes, and high-risk processes to processes that additionally implement watchpoint controls (described above with regard to FIG. 3) as part of their implementation. In another example, if the controller is determined to not be able to currently meet performance thresholds and there is not a current security threat, then the determined risk levels for code portions can be reduced.

Other conditions and modifications to risk levels for code portions are also possible, such as the ECU context as described above.

Risk levels and conditions for modifying risk levels can be recorded as part of the security policy for the controller (416). For example, the computer system 104 can store the in-memory graph, the determined risk levels, the conditions for risk level modifications, and/or other details (e.g. other heuristic information) as part of the security policy 108 that the controller 114 will use during runtime. The security policy 108, in some instances, can be "burned" into patched code that is delivered and installed on controllers, and may not be a separate policy file or data structure apart from the binary itself. For example, the distributed code can have the security policy burned in so that binary includes the runtime IMV code. Each code portion then includes appropriate code to check and verify the code portion to prevent an in-memory attack. The in-memory graph (as a singular data file or structure) may not be provided in such instances, but may instead be used to generate and insert the code to check for in-memory verification at appropriate locations, which can collectively represent the in-memory graph.

Referring to FIG. 4B, the process 450 is used to implement a custom security policy on a controller using conditional IMV, such as implementing the custom security policy determined using the process 400. For example, the process 450 can be performed by the controller 114 during runtime using the security policy 108.

Computer-readable code running on a controller is detected (452). For example, computer-readable code in the application layer 224 may be executed, interpreted, or otherwise run by the controller 202. The security agents 232, as instructed by the security policy 230, may detect the running of the computer-readable code. For example, messages between the application layer 224 and the kernel 238 may pass through the security agents 232, which may use listeners to detect those calls.

The computer-readable code is stored in a memory in a plurality of blocks, each block including one or more instructions to be performed by the controller. For example, the computer-readable code may be stored in the memory 320 in blocks 302-318. The blocks may include instructions that include, but are not limited to, modifying the memory 320, reading from the memory 320, passing control of the computer-readable code to a different memory address, and communicating with other computing devices.

Responsive to detecting the computer-readable code running on the controller, a current code portion (e.g., function) of the computer readable code that is running is identified (454). For example, the security agents may monitor the address in memory 320 of the instruction that is being executed by the controller 202, and identify the code portions 302-318 to which that address belongs.

An in-memory graph that models an operational flow of the computer-readable code is accessed (456). For example, the security agents 232 may access the in-memory graph, as determined in the process 400, from its storage location in the memory 206 by reading one or more memory locations that contain the in-memory graph.

The risk value for the current code portion is identified (458). The security agents 232 may look up the baseline/starting point risk value of the node in the in-memory graph (determined using the process 400) that corresponds to the code portion that is running on the controller 202. For example, if the code portion 310 is currently running on the controller 202, the security agents may look up the baseline risk value stored with node 310, which is a risk value of "2."

An IMV scheme is selected (460) from a plurality of IMV schemes based on the identified risk value. For example, the security policy 230 may use memory 206 to store a mapping of risk values to IMV schemes to indicate which IMV scheme should be used. This mapping may be a simple one-to-one mapping, with a particular risk value being mapped to one and only one IMV scheme. In some cases, the number of risk values may be the same as the number of IMV scheme (e.g., three risk values and three risk schemes). In some examples, the mapping between risk values and IMV schemes may be more complex than a simple one-to-one mapping. For example, the mapping may be conditional based on one or more variables. A medium risk value, for example, may be conditionally mapped to a low-intensity IMV scheme and a high-intensity IMV scheme. This mapping may incorporate variable that reflect the state of the environment in which controller (conditions on the controller) is operating, with a high-risk environment meaning the high-intensity IMV scheme should be used and a low-risk environment meaning a low-intensity IMV scheme should be used. For example, if risk levels can be elevated and/or reduced depending on the current condition of the controller, as described above with regard to step 414.

The selected IMV scheme is applied (462, 464, 466, 468) to the code portion as the code portion is running on the controller.

Responsive to a determination that the computer-readable code running on the controller fails the selected IMV scheme, a corrective action is taken (470). For example, if it is decided (462) by the security agents 232 to select an IMV scheme that specifies that no IMV checking should be done, the security agents 232 can allow system calls to pass with no IMV checking for the current block. This type of IMV scheme may be selected, for example, when there are is little to no risk of an out-of-range attack. An example of a function that provides little to no risk of an out-of-range attack is a function that does not modify memory or call, either directly or indirectly, any other functions that modify memory. Because the risk is found to be so small for such a block, the IMV checking may be avoided to prevent degradation of performance of the controller 202. In this way, code which does not provide a substantial security risk be run without overhead for security functions that are not needed to improve the security of the controller 202.

In another example, if it is decided (462) by the security agents 232 to select an IMV scheme that specifies that function validation should be done, the security agents 232 can verify that memory locations referenced by instructions of the current block contain the computer-readable code. For example, the security agents 232 may intercept system calls to the kernel 238 that pass control of the controller 202 (or other calls). These system calls can include function returns, functions to start a new thread, or "GOTO" style function calls that move control to a particular memory address. The security agents 232 may examine the parameters of these functions to identify any memory address in the parameters and determine if those memory addresses are within a code portion 302-318 or not. In some cases, this may be restricted to an entry point of the code portion 302-318 (e.g. the first instruction or another instruction specifically identified as an entry point). In some cases, this may be permitted as long as it is any address within the code portions 302-318, thus indicating that it contains computer-readable code of the control software 102. If the call is to an address outside of the permitted addresses, the security agents 232 can take (470) a corrective action. If the call is to an address within the permitted addresses, the security agents 232 can permit the call to pass.

In another example, if it is decided (462) by the security agents 232 to select an IMV scheme that specifies that memory addresses should be verified, the security agents 232 can verify memory address referenced by instructions of the current code portion. For example, the security agents 232 may intercept system calls to the kernel 238 that pass control of the controller 202 (or other calls). These system calls can include function returns, functions to start a new thread, or "GOTO" style function calls that move control to a particular memory address. The security agents 232 may examine the parameters of these functions to identify any memory address in the parameters and determine if those memory addresses are on a predefined list of permitted addresses.

For example, the security agents 232 may access a stored, predefined list of permitted addresses in the memory 206. Code portions 302-318 (or, e.g., each instruction or other logical unit) may be shown in this list to be permitted to use a closed list of permitted memory addresses. These lists may be different for each code portion, or may be shared by more than one code portion. When an instruction calls a system call using a memory address as a parameter (e.g., a return function to return to a particular memory address), the security agents 232 can access this list to determine if the memory address in the function call is a permitted address for the block. If the address is permitted, the security agents 232 can permit the call to pass. If the address it not a permitted address, the security agents 232 can take (470) a corrective action.

Corrective actions include actions taken by the security agent 232, or another element, to handle or mitigate the security risk of an unapproved action. Example corrective actions include, but are not limited to, halting the running of the computer-readable code, dropping a system call, modifying a system call (e.g., changing a memory address in a parameter), logging the system call (e.g., in the log 220), generating an alert (e.g., in the alerts 218), and engaging a user interface controlled by the controller 202 (e.g., illuminating an amber light). Different corrective actions may be used in different situations. For example, the security policy 230 may identify some security risks that are so grave, the controller 202 should be shut down when encountered, while other security risks should be logged only.

While a particular number, type, and order of operations have been described, others are possible. For example, as part of selecting (460), from a plurality of available flow control integrity (IMV) schemes, an IMV scheme based on the identified risk value, the security agents 232 may consider other input in selecting the IMV scheme. For example, the security agents 232 may access contextual information 250 and information received from external sources such as the management computer system 126 to determine the security environment of the controller 202. If the controller 202 is in a high-risk environment, a more-rigorous IMV scheme may be selected than would be selected otherwise. For example, instead of selecting a function validation scheme (see 466), the security agents 232 may select a memory validation scheme (see 468). Likewise, if the controller is in a low-risk environment, a less rigorous IMV scheme may be selected than would be selected otherwise. For example, instead of selecting a function validation scheme (see 466), the security agents 232 may select a pass-through scheme (see 464).

Examples of high-risk environments include times in which controllers like the controller 202 have been under attack. For example, when attackers learn of a security flaw in a particular software deployment, rates of attack on controllers using that software deployment increase sharply. In those time, an external system can send a notification to the controller 202 indicating that the controller 202 is operating in a high-risk environment. The security agents 232 can then use this information when selecting an IMV scheme, such as to select a more rigorous scheme.

Likewise, the operating environment of the controller 202 may be used as an indication of the security environment. For example, if the controller 202 disables network and removable media access in some conditions (e.g., an automobile controller when traveling), the security agents 232 can use the contextual information sources (e.g., speedometer) to determine the security environment—lower security when stopped and higher security when traveling at speed. In this way, a balance of security and performance can be found that takes into account both the riskiness of a particular block of computer-readable code and the context in which the controller 202 operates in.

FIG. 5 is a flowchart of an example process 500 for dynamically setting watchpoints during controller operation. The process 500 can be performed by any of a variety of systems, such as the systems 100, 150, 200, and 300, and/or controllers, such as the controller 114, the ECUs 156a-n, the controller 202, the controller using the memory 320, and/or other controllers and/or systems. The process 500 can be performed, for example, as part of the process 450. For example, the process 500 be implemented as part of and/or in addition to the conditional IMV steps described above, such as being performed in addition to the validate memory step (468) for particular code portions and/or under particular conditions on the controller. Additionally and/or alternatively, the process 500 can be performed separately from the process 450 on the controller.

A current code portion that a controller is performing can be identified (502) and a determination can be made as to whether watchpoints should be dynamically set for the current code portion (504). The determination of whether to dynamically set watchpoints, as described above with regard to FIG. 3, can be made based on any of a variety of factors. For example, watchpoints can be set for code portions that are determined to be high-risk. In another example, watchpoints can be set for code portions that are determined to be high-risk when the controller is operating under one or more current elevated conditions (e.g., currently under/recently blocked attack, notification from a central server system that attacks are currently being launched against a population of similar controllers). In another example, watchpoints can be set for all code portions when the controller is operating under such elevated conditions. Other factors can also be taken into account when determining whether to set watchpoints.

If the determination is that watchpoints should be set, then the locations for the watchpoints with regard to the current code portion can be determined (506). Such locations can be selected from a set of candidate locations that are preidentified as part of the security policy, for example, such as a location in memory at the end of the code portion and/or one or more locations at the end of other code portions (other functions) that are called within the code portion. The number of locations for watchpoints that are set can be limited by the number of watchpoints that are available for allocation on the controller. As described above, the number of watchpoints may be limited to a certain number (e.g., 4 watchpoints in total).

The watchpoints can be dynamically set during runtime at the determined locations in memory by the controller (508). For example, before proceeding with operation of the current code portion, the controller can dynamically set the watchpoints for current code portion. Once the watchpoints are set, the current code portion can be permitted to proceed on the controller (510). If one of the dynamically set watchpoints is triggered (512), then corrective action can be applied (514). The corrective action can be similar to the corrective action discussed above with regard to step 470. The process 500 can then repeat for some or all current code portions, such as part of process 450.

FIG. 6 is a block diagram of example computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent any other typically non-mobile devices, such as televisions or other electronic devices with one or more processers embedded therein or attached thereto. Computing device 650 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed controller 608 connecting to memory 604 and high-speed expansion ports 610, and a low-speed controller 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed bus 614. The low-speed bus 614 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as computing device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The computing device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the computing device 650, such as control of user interfaces, applications run by computing device 650, and wireless communication by computing device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of computing device 650 with other devices. External interface 662 may provide, for example, for wired communication (e.g., via a docking procedure) or for wireless communication (e.g., via Bluetooth® or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to computing device 650 through expansion interface 672, which may include, for example, a subscriber identification module (SIM) card interface. Such expansion memory 674 may provide extra storage space for computing device 650, or may also store applications or other information for computing device 650. Specifically, expansion memory 674 may include instructions to carry out or supplement the processes described above, and may include secure information also. Thus, for example, expansion memory 674 may be provide as a security module for computing device 650, and may be programmed with instructions that permit secure use of computing device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Computing device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 668 (e.g., a radio-frequency transceiver). In addition, short-range communication may occur, such as using a Bluetooth®, WiFi, or other such transceiver (not shown). In addition, GPS receiver module 670 may provide additional wireless data to computing device 650, which may be used as appropriate by applications running on computing device 650.

Computing device 650 may also communicate audibly using audio codec 660, which may receive spoken information from a user and convert it to usable digital information. Audio codec 660 may likewise generate audible sound for a user, such as through a speaker, e.g., in a handset of computing device 650. Such sound may include sound from voice telephone calls, may include recorded sound (e.g., voice messages, music files, etc.) and may also include sound generated by applications operating on computing device 650.

The computing device 650 may be implemented in a number of different forms, as shown in the figure. For example, it may be implemented as a cellular telephone 680. It may also be implemented as part of a smartphone 682, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

FIG. 7 is a flowchart of an example process 700 for selecting a form of validation. The process 500 can be run on any of a variety of systems, such as the systems 100, 150, 200, and 300, and/or controllers, such as the controller 114, the ECUs 156*a-n*, the controller 202, the controller using the memory 320, and/or other controllers and/or systems. The process 700 is described below with reference to some of these systems, controllers, and components, but can be applied to any appropriate system, controller, and/or component.

In the process 700, different return-validation mechanisms are selected from in order to achieve different balances of security confidence and efficiency. In this way, a designer can advantageously select a trade-off that is applicable to a particular use of the technology described here. For example, as a task becomes more computationally intensive, security confidence may be traded for computational efficiency.

When performing IMV, one or more return addresses are often examined. For example, the controller 202 can examine return statements made by running code in order to determine if the code is operating in an expected way or in an unexpected and potentially malicious way. The process 700 can be used to apply one validation process to a particular call, with the validation process selected from a plurality of validation processes. In this example, there are three possible validation processes, but in other examples, there may be more or fewer possible validation processes.

A number possible return addresses is identified 702. For example, for one or each of the code portion 302-318, the number of possible return addresses is identified. This analysis may be performed as part of the static analysis used to generate the in memory graph 300 that defines control flow. For example, each node in the in memory graph 300 may be assigned a number that records the identified number of possible return addresses.

The number of possible return addresses are compared with threshold values 704. For example, a low-threshold value may be set that defines the maximum number of possible return values handled as a low number of possible return values. That is to say, for a low-threshold value of, say, eight, any function having eight or fewer possible return values can be considered as having a low number of possible return values.

A high-threshold value may be set that defines the minimum number of possible return values handled as a high number of possible return values. That is to say, for a high-threshold value of, say, thirty two, any function having thirty two or more possible return values can be considered as having a high number of possible return values.

For possible return values higher than the low-threshold and lower than the high-threshold, these possible return values may be handled as a mid-level number of return values. That is to say, for possible return values of, say, nine to thirty one, these return-values may be considered as having a mid-level number of possible return values.

Possible addresses are sorted for linear searching 706. For example, for code portion 302-318 having less than the low-threshold number of possible return values, the possible return values may be collected and sorted into a an ordered list of possible return addresses. This ordered list of possible return addresses may be stored, for example, in the test code 338. When an associated code portion 302-318 generates a return address, this generated return address can be searched for within the ordered list of return values.

Possible addresses are indexed for binary searching 708. For example, for code portion 302-318 having more than the low-threshold number of possible return values and less than the high-threshold number of possible return values, the possible return values may be indexed into, for example, a binary search tree. This binary search tree may be stored, for example, in the test code 338. When an associated code portion 302-318 generates a return address, this generated return address can be searched for binary search tree of return values, Alternative validations are selected 710. For example, for code portions 302-318 having more than the high-threshold number of possible return values, an alternative form of validation may be selected. For example, opcode (or operation-code) validation may be used for a code portion 302-318 having more than high-threshold number of possible return addresses. In opcode validation, a table of permitted operations is recorded in the computer memory for access by the test code 338, and each operation attempted by the code portion 302-318 is compared against this table. If the attempted operation matches an opcode stored in the table, the operation can be permitted and if the operation does not match a stored opcode, the operation can be prevented.

Return address validation by searching is performed 712 and return address validation is performed by the alternative validation 714. For example, as the code portions 302-318 are executed, the test code 318 performs validation as described above.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for hardening network-accessible controllers through integrating a customized security layer, the method comprising:
   identifying computer-readable code configured to be run on a particular controller, wherein the computer-readable code is configured to be stored in a memory in a plurality of code portions, each code portion comprising one or more instructions to be performed by the particular controller;
   identifying contextual information associated with the particular controller;

identifying a specific code portion from the plurality of code portions that is configured to be run on the particular controller;
selecting, from a plurality of available flow control integrity (IMV) schemes, an IMV scheme based on the identified contextual information, wherein the selected IMV scheme specifies instructions for at least one of:
  function validation, or
  memory address verification;
applying the selected IMV scheme to the identified specific code portion; and
hardening the particular controller by deploying the specific code portion to run on the particular controller according to the applied IMV scheme.

2. The method of claim 1, wherein the identified contextual information identifies at least one of an operating system of the particular controller or a processor associated with the particular controller.

3. The method of claim 1, wherein at least a portion of the contextual information is from a source external to the particular controller.

4. The method of claim 1, wherein applying the selected IMV scheme to the identified specific code portion comprises accessing an in-memory graph that models an operational flow of the specific code portion.

5. The method of claim 4, wherein the in-memory graph includes elements identifying a risk level associated with the specific code portion.

6. The method of claim 5, wherein the risk level is based on at least one of:
  a memory modification operation;
  a memory allocation operation;
  a memory jump;
  a function call; or
  a function call jump.

7. The method of claim 5, wherein the risk level is elevated in response to a security threat associated with the particular controller.

8. The method of claim 1, wherein hardening the particular controller further comprises generating one or more signatures for the specific code portion.

9. The method of claim 1, wherein the identified contextual information includes a security policy associated with the particular controller.

10. The method of claim 1, wherein the specific code portion is a first specific code portion, and the method further comprises:
  identifying a second specific code portion from the plurality of code portions that is configured to be run on the particular controller; and
  determining that no IMV scheme should be applied to the second specific code portion.

11. A non-transitory computer readable medium including instructions that, when executed by at least one processor, cause the at least one processor to perform operations for hardening network-accessible controllers through integrating a customized security layer, comprising:
  identifying computer-readable code configured to be run on a particular controller, wherein the computer-readable code is configured to be stored in a memory in a plurality of code portions, each code portion comprising one or more instructions to be performed by the particular controller;
  identifying contextual information associated with the particular controller, at least a portion of the contextual information being from a source external to the particular controller;
  identifying a specific code portion from the plurality of code portions that is configured to be run on the particular controller;
  selecting, from a plurality of available flow control integrity (IMV) schemes, an IMV scheme based on the identified contextual information, wherein the selected IMV scheme specifies instructions for at least one of:
    function validation, or
    memory address verification;
  applying the selected IMV scheme to the identified specific code portion; and
  hardening the particular controller by deploying the specific code portion to run on the particular controller according to the applied IMV scheme.

12. The computer readable medium of claim 11, wherein applying the selected IMV scheme to the identified specific code portion comprises accessing an in-memory graph that models an operational flow of the specific code portion.

13. The computer readable medium of claim 12, wherein the in-memory graph includes elements identifying a risk level associated with the specific code portion.

14. The computer readable medium of claim 11, wherein the risk level is based on at least one of:
  a memory modification operation;
  a memory allocation operation;
  a memory jump;
  a function call; or
  a function call jump.

15. The computer readable medium of claim 11, wherein applying the selected IMV scheme to the identified specific code portion comprises determining whether a call contained in the identified specific code portion accesses a memory address outside a predefined set of memory addresses.

16. The computer readable medium of claim 11, wherein enabling the specific code portion to run on the particular controller with the applied IMV scheme comprises combining binary code from the particular controller with runtime IMV code.

17. The computer readable medium of claim 11, wherein enabling the specific code portion to run on the particular controller with the applied IMV scheme comprises configuring the specific code portion to dynamically set at least one watchpoint of the particular controller.

18. The computer readable medium of claim 11, wherein applying the selected IMV scheme to the identified specific code portion comprises at least one of:
  dropping a system call;
  modifying a system call;
  changing a memory address parameter;
  logging a system call; or
  generating an alert.

19. The computer readable medium of claim 11, wherein:
  the particular controller is a first controller; and
  the identified contextual information includes a context from a second controller.

20. The computer readable medium of claim 11, wherein:
  the particular controller is associated with a system; and
  the identified contextual information includes a physical location or an operational state of the system.

* * * * *